US011625785B2

(12) United States Patent
Ayikara Kizhakayil et al.

(10) Patent No.: US 11,625,785 B2
(45) Date of Patent: Apr. 11, 2023

(54) SECURE ELECTRONIC TOKENS IN AN ELECTRONIC TOKENING SYSTEM

(71) Applicant: Chicago Mercantile Exchange Inc., Chicago, IL (US)

(72) Inventors: Mohandas Ayikara Kizhakayil, Naperville, IL (US); Graham Robert McDannel, Chicago, IL (US); Bluford Hugh Putnam, Highland Park, IL (US); Qifan Wu, Evanston, IL (US); Vijay Mani Pillai, Chicago, IL (US); James Joseph Boudreault, Kildeer, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 909 days.

(21) Appl. No.: 15/613,943

(22) Filed: Jun. 5, 2017

(65) Prior Publication Data

US 2018/0349898 A1    Dec. 6, 2018

(51) Int. Cl.
| | |
|---|---|
| G06Q 40/06 | (2012.01) |
| G06Q 20/38 | (2012.01) |
| H04L 9/32 | (2006.01) |
| H04L 9/40 | (2022.01) |
| G06F 21/34 | (2013.01) |

(52) U.S. Cl.
CPC ............ *G06Q 40/06* (2013.01); *G06F 21/34* (2013.01); *G06Q 20/38215* (2013.01); *H04L 9/3213* (2013.01); *H04L 63/123* (2013.01)

(58) Field of Classification Search
None
See application file for complete search history.

(56) References Cited

U.S. PATENT DOCUMENTS

| | | | |
|---|---|---|---|
| 6,892,184 | B1 | 5/2005 | Komem et al. |
| 6,941,280 | B1 * | 9/2005 | Gastineau ............... G06Q 20/10 |
| | | | 235/379 |
| 6,993,507 | B2 | 1/2006 | Meyer et al. |
| 7,039,610 | B2 | 5/2006 | Morano et al. |
| 7,543,066 | B2 | 6/2009 | Colasurdo et al. |
| 7,831,491 | B2 | 11/2010 | Newell et al. |
| 8,831,979 | B1 | 9/2014 | Gerson |
| 8,935,187 | B2 | 1/2015 | Higgins, Sr. et al. |

(Continued)

FOREIGN PATENT DOCUMENTS

| | | |
|---|---|---|
| CA | 2361489 A1 | 8/2000 |
| WO | WO2013066910 A1 | 5/2013 |

OTHER PUBLICATIONS

Extended European Search Report, from EP Application No. 18175576.0, dated Oct. 19, 2018.

(Continued)

*Primary Examiner* — Steven S Kim
*Assistant Examiner* — Jason B Fenstermacher
(74) *Attorney, Agent, or Firm* — Lempia Summerfield Katz LLC

(57) ABSTRACT

An electronic tokening system implemented by a data source transmits secure electronic tokens including time-based values to a plurality of terminals. The terminals may be geographically disparate, and the different terminals may have different connection speeds to the data source. The terminals may use the secure electronic tokens to consistently and reliable calculate data values.

17 Claims, 14 Drawing Sheets

(56) References Cited

U.S. PATENT DOCUMENTS

| | | | |
|---|---|---|---|
| 9,747,591 B2 | 8/2017 | Keitz et al. | |
| 2004/0210476 A1 | 10/2004 | Blair et al. | |
| 2005/0096999 A1 | 5/2005 | Newell et al. | |
| 2005/0137961 A1* | 6/2005 | Brann | G06Q 40/04 705/37 |
| 2005/0144061 A1* | 6/2005 | Rarity | G06Q 40/00 705/35 |
| 2005/0165859 A1 | 7/2005 | Geyer et al. | |
| 2005/0203826 A1 | 9/2005 | Farrell et al. | |
| 2007/0038523 A1 | 2/2007 | Komem et al. | |
| 2008/0222048 A1 | 9/2008 | Higgins et al. | |
| 2009/0108080 A1 | 4/2009 | Meyer et al. | |
| 2011/0196790 A1 | 8/2011 | Milne | |
| 2011/0233285 A1 | 9/2011 | Meyer et al. | |
| 2012/0191606 A1 | 7/2012 | Milne | |
| 2012/0203608 A1 | 8/2012 | Lele et al. | |
| 2012/0203681 A1 | 8/2012 | Lele et al. | |
| 2012/0209775 A1 | 8/2012 | Milne | |
| 2012/0278201 A1 | 11/2012 | Milne | |
| 2013/0062421 A1 | 3/2013 | Meyer et al. | |
| 2013/0151857 A1* | 6/2013 | Agrawal | H04L 9/3247 713/178 |
| 2013/0282577 A1 | 10/2013 | Milne | |
| 2013/0332362 A1 | 12/2013 | Ciurea | |
| 2014/0006243 A1 | 1/2014 | Boudreault et al. | |
| 2014/0067565 A1* | 3/2014 | Brown | G06Q 20/405 705/17 |
| 2014/0129428 A1 | 5/2014 | Tyler et al. | |
| 2014/0222675 A1 | 8/2014 | Mao et al. | |
| 2014/0236817 A1 | 8/2014 | Meyer et al. | |
| 2014/0279094 A1 | 9/2014 | Neighman et al. | |
| 2014/0279469 A1 | 9/2014 | Mendes | |
| 2014/0279472 A1 | 9/2014 | Caglayan et al. | |
| 2014/0279483 A1 | 9/2014 | Bridges et al. | |
| 2014/0310174 A1 | 10/2014 | Heeter | |
| 2015/0127513 A1 | 5/2015 | Studnitzer et al. | |
| 2015/0242949 A1* | 8/2015 | Phillips, IV | G06Q 40/04 705/37 |
| 2015/0262301 A1 | 9/2015 | Lele et al. | |
| 2016/0104155 A1 | 4/2016 | McGaugh et al. | |
| 2016/0328706 A1* | 11/2016 | Kennedy | G06Q 20/381 |
| 2017/0329980 A1* | 11/2017 | Hu | G06F 21/78 |
| 2017/0344967 A1* | 11/2017 | Keitz | G06Q 20/12 |

OTHER PUBLICATIONS

Tsai Wei-Tek et al., A System View of Financial Blockchains, Mar. 29, 2016, 2016 IEEE Symposium on Service-Oriented System Engineering.
"How a Credit Card is Processed", CreditCards.com, 2013, 5 pages.
"Your Favorite Stocks by the Dollar", Stockpile, https://www.stockpile.com/, retrieved Apr. 13, 2017.
Barcoded Bill Payment, PayScan America, retrieved Aug. 21, 2014, 2 pages, http://www.payscan.com.
CCAsh, 2014, 2 pages, https://gust.com/companies/ccash.
ConfirmHub, CME, retrieved Sep. 7, 2011, 1 page.
Dan Blystone, "How Stockpile Works", Investopedia, Nov. 9, 2015, 2 pages.
Dave Smith, "Barclays: The iPhone 6 and iWatch Will be Vital to Apple's Big 'Data Play'", Business Insider, Aug. 15, 2014, 4 pages.
Elizabeth Mcquerry, Report from Sibos 2014—Payments Views from Glenbrook Partners, Glenbrook Partners LLC, Oct. 1, 2014, 4 pages.
FAQs about PayScan America, Inc., PayScan America, retrieved Aug. 21, 2014, 5 pages, http://www.payscan.com/faq/payscan.
ICE eConfirm FAQs, ICE Global Markets in Clear View, Apr. 2012, 6 pages.
International Search Report and Written Opinion, from PCT Application No. PCT/2016/054683, dated Dec. 21, 2016, WO.
International Search Report and Written Opinion, from PCT/US2016/054677, dated Dec. 13, 2016, WO.
Joe Gardyasz, "Dwolla creates new system for online payments", Business Record, May 22, 2010, 3 pages.
John Edwards, "4 Factors You Didn't Know About RBOB", Investopedia, Mar. 5, 2016, 2 pages, http://www.investopedia.com/articles/investing/030516/4-factors-you-didnt-know-about-rbob.asp.
PayScan America, Inc. Technology, PayScan America, retrieved Aug. 21, 2014, 2 pages, www.payscan.com/technology.com.
SmartPay, Inc., Mobile Payment QR Code Based System, Vator, retrieved Oct. 16, 2014, 7 pages, http://vator.tv/company/smartpay.
SmartPay, Mobile Payment Interface, 2014, 1 page, http://www.smartpayusa.com.
Thomas Heeter, SmartPay: Signup, Login and Make a Payment, YouTube video, May 25, 2012, http://www.youtube.com/watch?v=0ywibll29dE.
What is Dwolla?, Dwolla, 2014, 11 pages, https://www.dwolla.com/about.
Yoni Heisler, "Apply Pay: An in-depth look at what's behind the secure payment system", Engadget, Oct. 2, 2014, 8 pages.

\* cited by examiner

SECURE ELECTRONIC TOKENS IN AN ELECTRONIC TOKENING SYSTEM

BACKGROUND

Electronic information is typically not consumed or used at the same geographical location where the electronic information is generated. In many cases, a data or information source will propagate or broadcast information to a plurality of consumers. The data is often transmitted substantially simultaneously to the recipients over networks, such as the Internet, where the networking protocols attempt a best effort to transmit the data as quickly as possible. For data clients that run mission critical or latency-sensitive applications, networking protocols and greater computing resources (e.g., more bandwidth) may be utilized to ensure timely data transfer. However, disparities in the network paths, variances in congestion, transmission errors and other transient events, e.g., lost/dropped packets, etc., may result in the data arriving at the various client devices at different times. Further, in some applications, the data source may generate new or updated data very quickly, i.e., the data fluctuates continuously. Moreover, different terminals or data clients that use the data may receive different data values at the same time, especially if the data is consumed at various different geographically disparate terminals.

FIGURES

DETAILED DESCRIPTION

Figure 1:
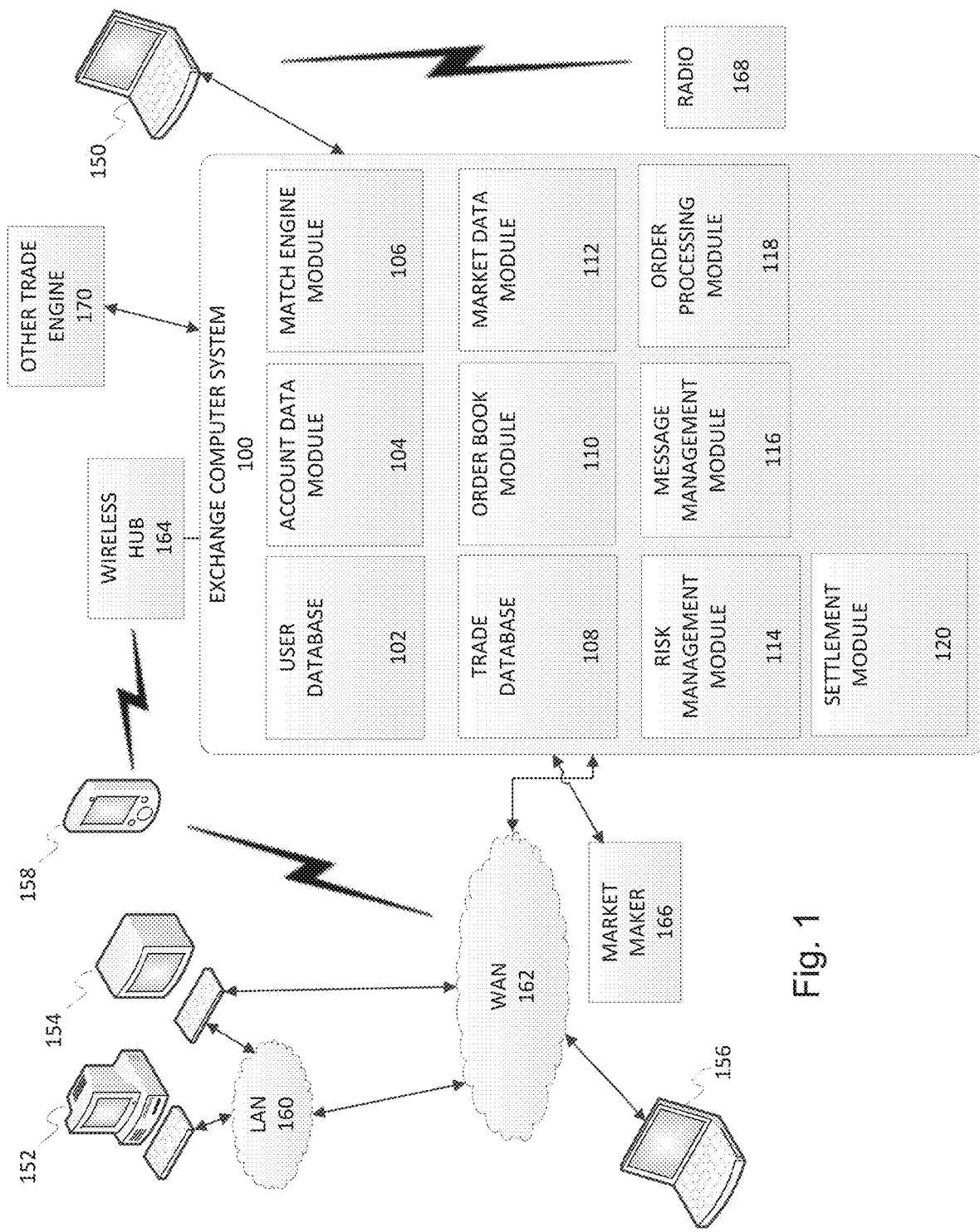
FIG. 1 depicts a computer network system, according to some embodiments.

Futures and options trading is typically accessible to sophisticated traders who have set up an account with a financial instrument trading system, such as a futures exchange, such as the Chicago Mercantile Exchange Inc. (CME). The value of a futures or options contract can fluctuate quickly. Futures and options contracts are examples of financial instruments that may be financial derivative products that are functions of or related to other futures contracts, swaps, swaptions, or other financial instruments that have their price related to or derived from an underlying product, security, commodity, equity, index, or interest rate product. The value of underlying commodities can often change continuously. Point-of-sale terminals, which typically handle many consumer transactions, do not have reliable, real-time values for complex financial instruments such as futures and options.

The disclosed embodiments generally relate to methods and systems for controlled propagation and distribution of secure electronic tokens that include data representative of values of financial instruments. The secure electronic tokens are only available at specific times, and are only valid if transacted upon, or operated upon, within specific times. A token availability time window may be the same as, but could differ from, a token validity time window. The secure electronic tokens facilitate real-time, or near-real time, pricing availability for financial devices circulated to consumers, as discussed herein, and redeemed or utilized at terminals world-wide. The financial devices may be formed from a fraction or a portion of a financial instrument traded on a futures exchange. Financial devices may be physical devices, e.g., coins or cards, or virtual/logical devices, i.e., they may be implemented as a software application that can be executed on a smartphone, laptop, computer, or other device.

The disclosed embodiments relate to systems for redeeming and/or transacting upon financial devices that represent or act as surrogates for portions of financial instruments, such as futures contracts, options contracts, or forward swaps, or currency swaps. The financial devices may be owned and circulated by a distributor that is a broker/trader registered with an exchange computing system. A financial device may be a physical object, e.g., a coin, or a plastic card having a storage medium that contains/stores information (such as a unique identifier), in an optical, e.g. barcode, QR code or hologram, or RFID or other electronically accessible format (e.g., Chip and PIN or Chip and Signature cards, or Europay, MasterCard, and Visa (EMV) cards, or Apple Pay®, Google Waller®). In one embodiment, the financial devices may be magnetic stripe cards capable of storing data by modifying the magnetism of tiny iron-based magnetic particles on a band of magnetic material on the card. The magnetic stripe, and data contained therein, may be read by swiping past a magnetic reading head, which may be provided at terminals.

It is understood that data cannot typically (e.g., aside from using quantum mechanical based technologies) be generated at a first location and be immediately replicated or made available at other locations. Data transfer is limited by the ability of the data carrying media to transfer the data. One physical limit is that data transfer based on electricity can travel, at a maximum, at the speed of light. The minimum time needed to transfer data increases when networking infrastructure and components are considered. Point-of-sale ("POS") terminals that all redeem or transact upon a constantly fluctuating financial device need to not only receive value information for the financial device in near real-time, they also need to be synchronized so that all financial devices that are related and redeemed substantially simultaneously are transacted or executed at the same approved value. Substantially simultaneously may mean within the amount of time that a data source may determine that a value has changed and disseminate that change in the fasted available manner to the data consumers such that any discrepancy in the time of receipt by any two recipients is negligible, i.e., any one recipient would be unable to capitalize upon the receipt of the information before another recipient receives that same information.

If the financial device represents or acts as a surrogate for a portion of a financial instrument for which one or more other financial devices represent some or all of the remaining portions, then it may be important for the owner of the financial instrument to be able to adjust, in real-time or near real-time, the values for all of those financial devices upon redemption, where the financial devices are configured to be redeemable or facilitate redemption at a plurality of terminals, e.g., located throughout the country, or the world.

Exchange Computing System

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

Electronic Data Transaction Request Messages

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancellations and the like, as well as other message types. Inbound messages may be sent from market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereof, or rested. The response may further include a message to all market participants reporting a change in the order book due to the order. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" e.g., Aggregated By Value ("ABV") book, or Market By Order "MBO", e.g., Per Order ("PO") book format). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order or Per Order, Market Depth (also known as Market by Price or Aggregated By Value to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, also known as an Aggregated By Value ("ABV") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed also known as a Per Order ("PO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO/PO messages may carry much more data than MBP/ABV messages because MBO/PO messages reflect information about each order, whereas MBP/ABV messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An ABV book data object may include information about multiple values. The ABV book data object may be arranged and structured so that information about each value is aggregated together. Thus, for a given value V, the ABV book data object may aggregate all the information by value, such as for example, the number of orders having a certain position at value V, the quantity of total orders resting at value V, etc. Thus, the value field may be the key, or may be a unique field, within an ABV book data object. In one embodiment, the value for each entry within the ABV book data object is different. In one embodiment, information in an ABV book data object is presented in a manner such that the value field is the most granular field of information.

A PO book data object may include information about multiple orders. The PO book data object may be arranged and structured so that information about each order is represented. Thus, for a given order O, the PO book data object may provide all of the information for order O. Thus, the order field may be the key, or may be a unique field, within a PO book data object. In one embodiment, the order ID for each entry within the PO book data object is different. In one embodiment, information in a PO book data object is presented in a manner such that the order field is the most granular field of information.

Thus, the PO book data object may include data about unique orders, e.g., all unique resting orders for a product, and the ABV book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP/ABV and MBO/PO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate a PO book object and an ABV book object. It should be appreciated that each book object, or view for a product or market, may be derived from the Per Order book object, which includes all the orders for a given financial product or market.

An inbound message may include an order that affects the PO book object, the ABV book object, or both. An outbound message may include data from one or more of the structures within the exchange computing system, e.g., the PO book object queues or the ABV book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

Market Segment Gateway

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. Patent Publication No. 2015/0127513 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013 ("the '513 Publication"), the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which the disclosed embodiments apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see the '513 Publication.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
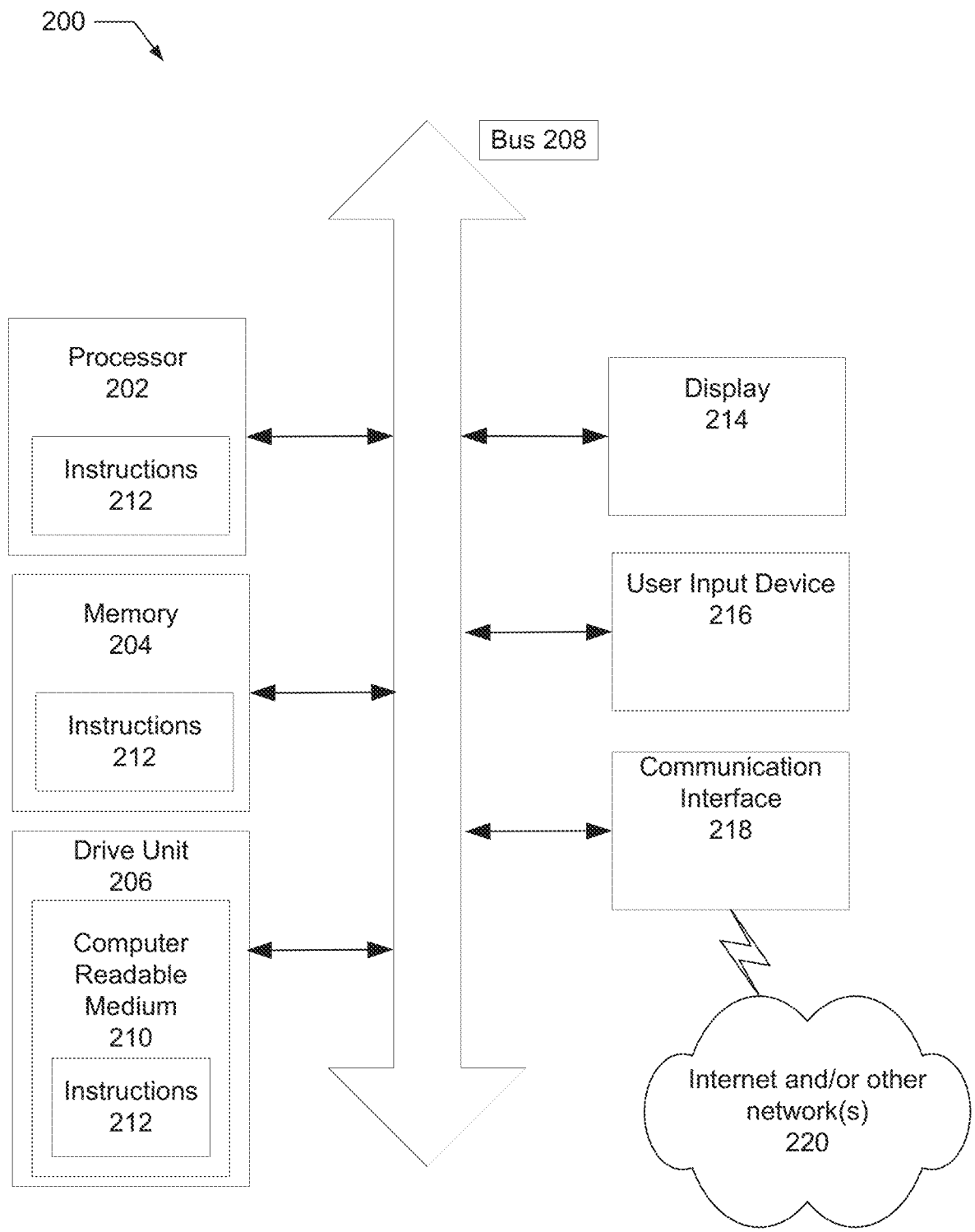
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120, or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118, and used for determining MQI scores of market participants.

Example Users

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for relinquish or sell transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

One exemplary system for matching is described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

Implication

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order in order to create matches therein, are referred to as "implied" orders. Upon receipt of an incoming order, the identification or derivation of suitable implied orders which would allow at least a partial trade of the incoming outright order to be executed is referred to as "implication" or "implied matching", the identified orders being referred to as an "implied match." Depending on the number component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number component financial instruments involved, and whether those component financial instruments further comprise component financial instruments of their own, there may be numerous implied opportunities, the submission of a counter order in response thereto, would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the Exchange will benefit from increased transaction volume. However, identifying implied opportunities may be computationally intensive. In a high performance trading system where low transaction latency is important, it may be important to identify and advertise implied opportunities quickly so as to improve or maintain market participant interest and/or market liquidity.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

Order Book Object Data Structures

Figure 3A:
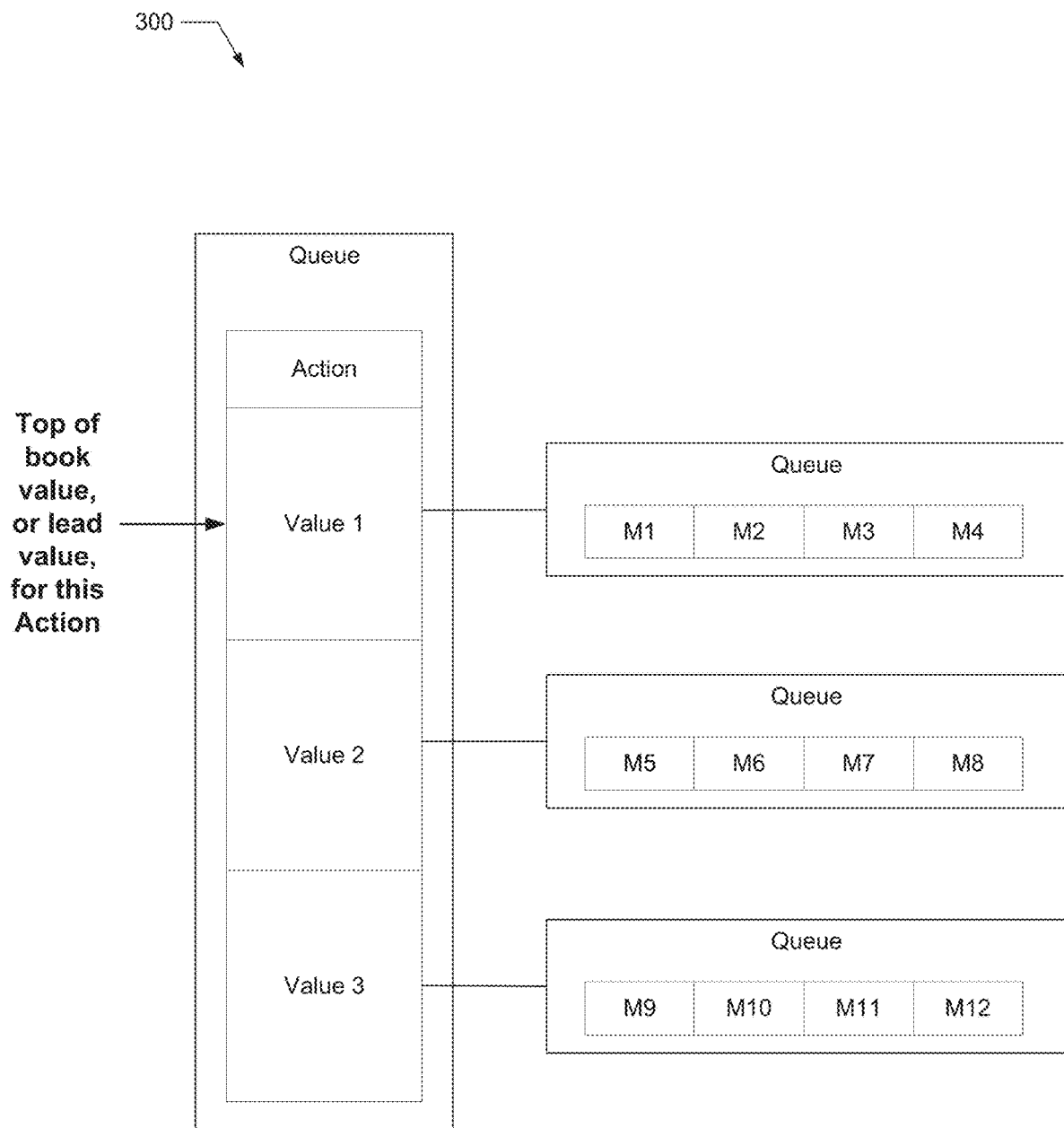
FIG. 3A depicts a storage data structure, according to some embodiments.

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially, e.g., in FIG. 3B below, may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action.

Figure 3B:
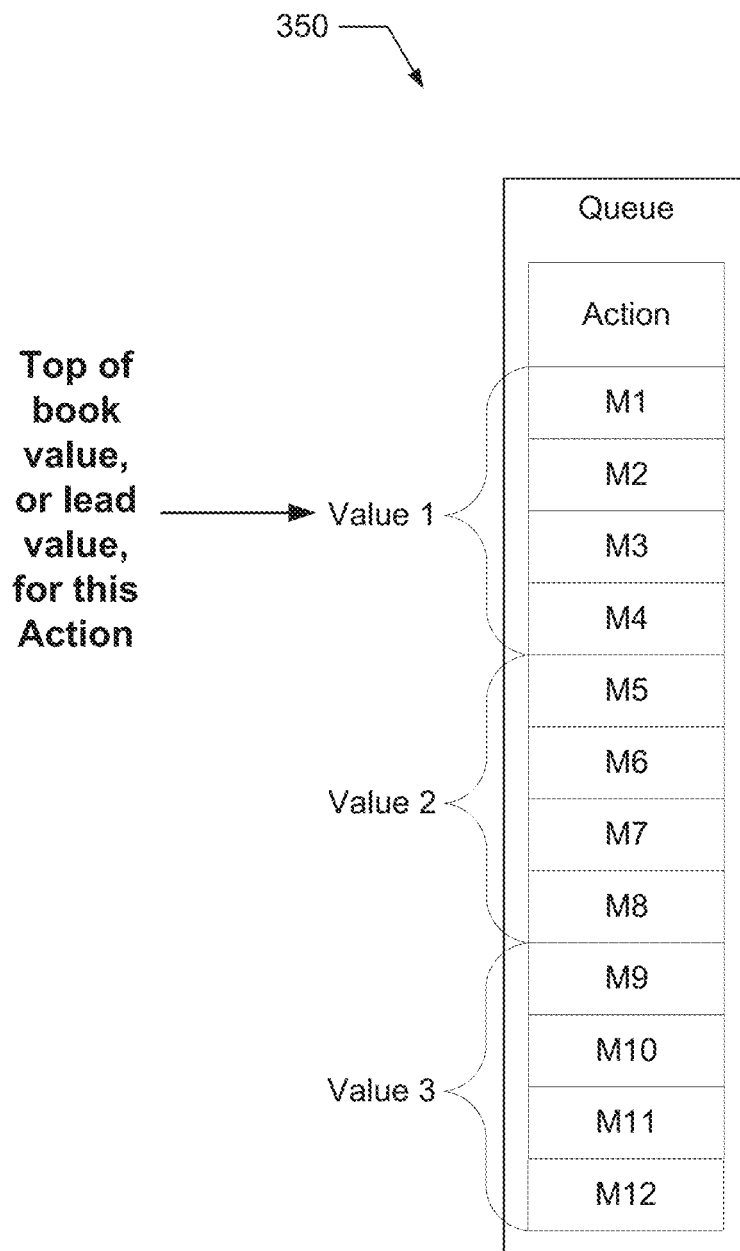
FIG. 3B depicts an alternative storage data structure, according to some embodiments.

FIG. 3B illustrates an example alternative data structure 350 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 3C:
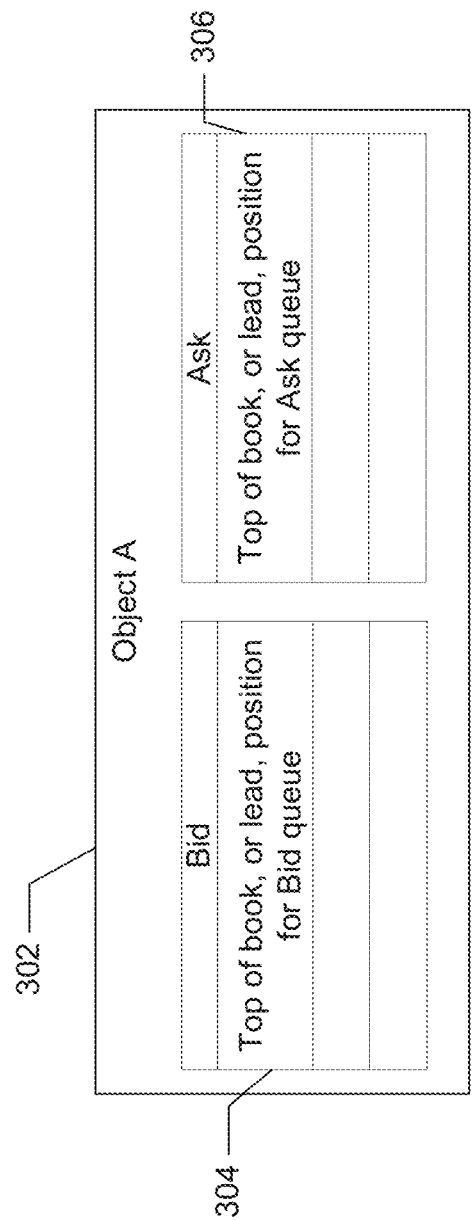
FIG. 3C depicts an order book data structure, according to some embodiments.

For example, as shown in FIG. 3C, the order book module of a computing system may include several paired queues, such as queues Bid and Ask for an object 302 (e.g., Object A). The system may include two queues, or one pair of queues, for each object that is matched or processed by the system. In one embodiment, the system stores messages in the queues that have not yet been matched or processed. FIG. 3C may be an implementation of the data structures disclosed in FIGS. 3A and/or 3B. Each queue may have a top of book, or lead, position, such as positions 304 and 306, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object. The messages may be received from the same or different users or traders.

The queues illustrated in FIG. 3C hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system. When the data transaction processing system is implemented as an exchange computing system, as discussed above, different client computers submit electronic data transaction request messages to the exchange computing system. Electronic data transaction request messages include requests to perform a transaction on a data object, e.g., at a value for a quantity. The exchange computing system includes a transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean higher or lower value depending on the specific transaction requested. For example, a buy order may match at the submitted buy value or a lower (e.g., better) value. A sell order may match at the submitted sell value or a higher (e.g., better) value.

Transaction Processor Data Structures

Figure 4:
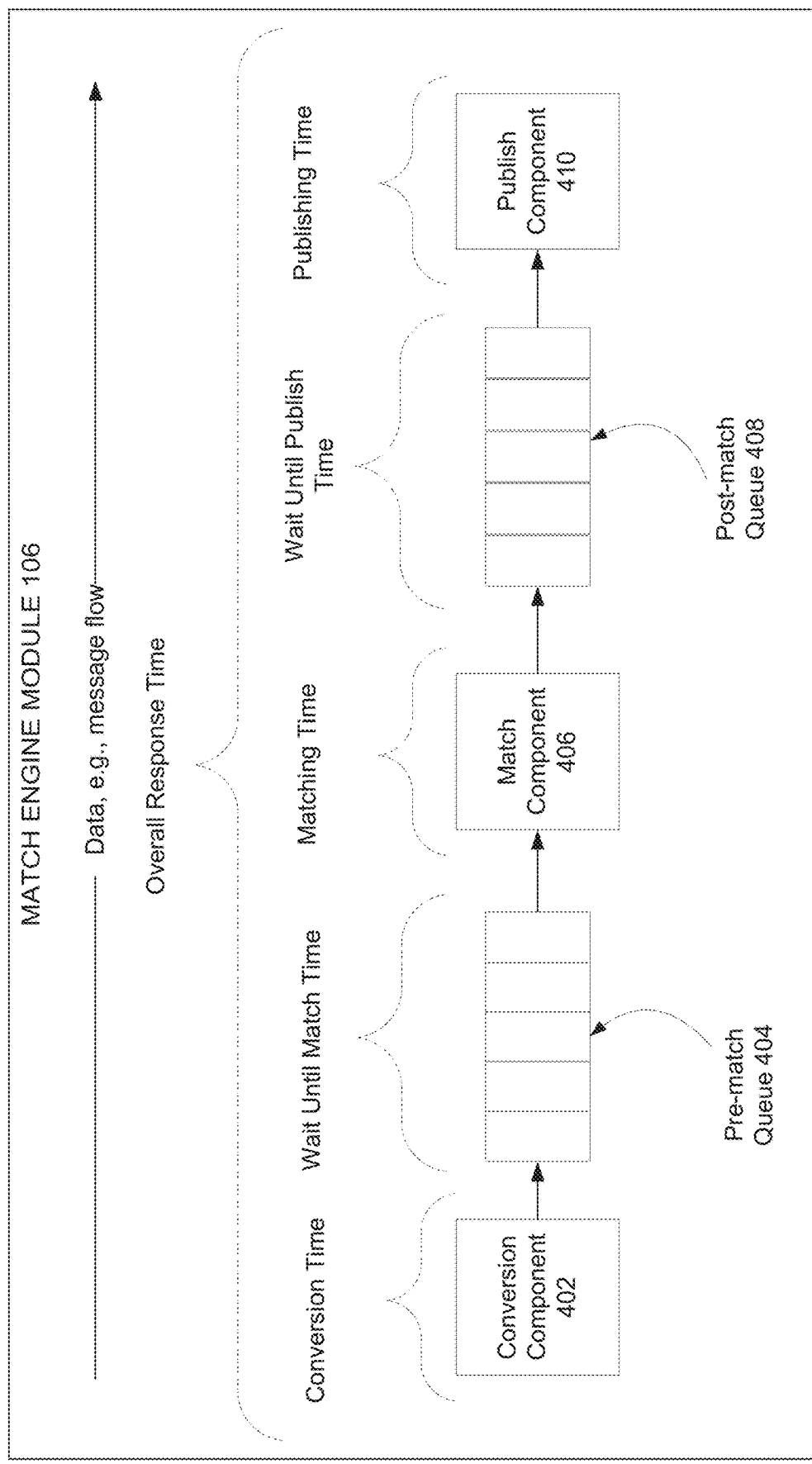
FIG. 4 depicts a match engine module, according to some embodiments.

FIG. 4 illustrates an example embodiment of a data structure used to implement match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first in first out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a messages spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out FIFO methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4, a difference between the pre- and post-match queues may be the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

Secure Electronic Tokens and Electronic Tokening System

As discussed herein, a financial instrument such as futures or options contracts are traded on or via a financial exchange computing system. Exchange computing systems typically require traders to be a registered broker or be affiliated with a registered broker, and meet strict margin requirements. Futures and options contracts that are traded on the exchange computing system are also cleared by the exchange computing system. Such sophisticated financial instruments are typically not appropriate and/or not available directly for consumption to laypeople or the average person who is not a trader. The disclosed embodiments enable a distributor, who may be a futures or options trader or trading firm, to apportion complex financial instruments into financial devices that can then be directly owned by an end user who may not a registered trader at an exchange computing system, e.g., a lay person. In particular, the distributor, which may be a bank, makes financial devices available for purchase, where a plurality of the financial devices all relate to the same financial instrument, i.e., the financial devices each represent a fractional interest in the financial instrument. The financial device value (e.g., operative value as discussed below) should vary and fluctuate along with the changes in the value of the financial instrument, which may be traded upon in the exchange computing system. In one embodiment, the financial devices are bought and redeemed at different geographically disparate terminals that have different connection speeds to the distributor's systems, e.g., servers.

In one embodiment, only one financial device may be made available for purchase based on a financial instrument, i.e., the financial device represents 100% of the interest in the financial instrument.

The financial devices can be used by consumers to buy goods or services. The financial devices may thus be implemented as an alternative form of payment. Typical payment systems in the retail industry are transacted in cash, whether by physical cash or by using a credit or debit card. Pre-paid gift cards are also backed by cash. The disclosed financial devices differ from cash, credit cards or gift cards, at least in part, because the value of the financial devices (either the value for purchasing the financial devices, or for redeeming the financial devices for other goods or services) is based on the financial instrument upon which the financial devices are based. Again, a financial instrument is one whose value may fluctuate in real time, at least during a trading session, due to it being traded or otherwise being transacted in an electronic marketplace. The distributor thus accepts a level of risk that the terminals will accurately and reliably determine the value of the financial device at the time of the transaction while still completing the transaction for the consumer (e.g., a purchase of the financial device or redemption of the financial device at one of the terminals) within a reasonable amount of time, such that users are motivated to use the financial device as a mode of payment. The financial devices may incentivize non-finance experts (e.g., lay people) to pay attention to the futures and options markets and to become more involved in and knowledgeable about futures and options markets. In other words, if lay people own, hold and use financial devices whose values track or fluctuate with complex financial instruments such as those traded and cleared at the CME, such lay people will increase their knowledge, awareness and understanding of complex financial markets.

In one embodiment, a secure electronic token is implemented in a tokening system for ensuring that different terminals are enabled to arrive at the same value for the financial devices at the same time, where the values have been approved and are under the control of the distributor, thus removing some of the risk and uncertainties with making financial devices available for consumer purchase and use.

Figure 5:
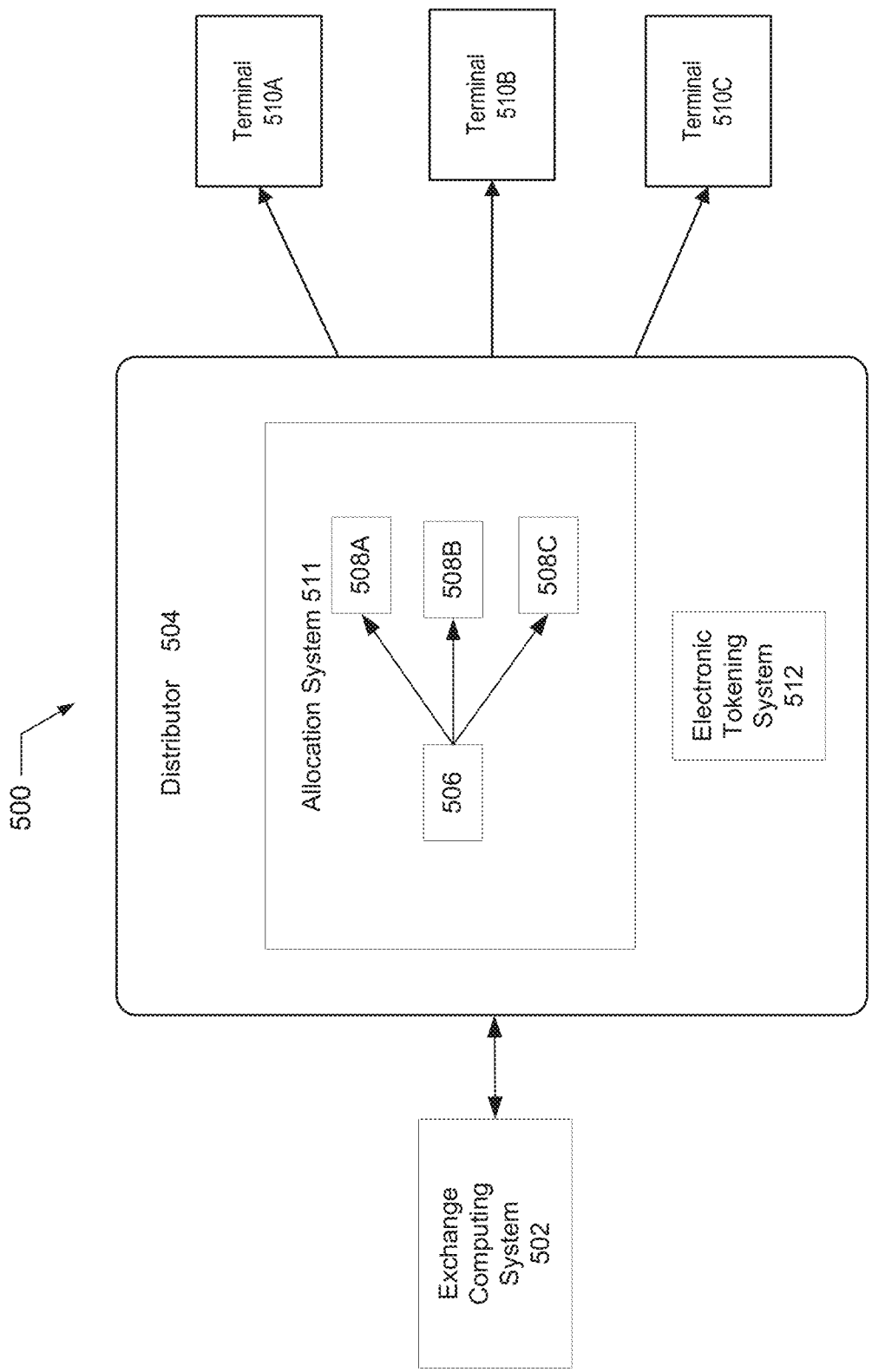
FIG. 5 depicts an example computer system including an electronic tokening system, according to some embodiments.

FIG. 5 illustrates an example computer system 500, including the disclosed tokening system, that enables customers to own portions of financial instruments that continuously fluctuate in value, which can be redeemed at any one of a plurality of terminals which may be dispersed at geographically disparate locations.

Computer system 500 includes distributor 504, which may be a trader or a broker registered to trade at an exchange computing system 502. In one embodiment, the distributor 504 may be a bank or a financial institution that trades futures and options at the exchange computing system, such as the CME. Exchange computing system 502 may be similar to, or implemented at least in part like, the exchange computing system 100 described in connection with FIG. 1. Exchange computing system 502 may, in one embodiment, provide continuous/periodic information to the distributor 504 about the order book object associated with a financial instrument. The distributor 504 purchases futures contracts from exchange computing system 502. For example, distributor 504 may purchase Reformulated Gasoline Blendstock for Oxygen Blending (RBOB) gasoline futures contract 506. An RBOB futures contract of may be associated with a defined quantity of gasoline, e.g., a defined number of gallons, e.g., 42,000 gallons. Distributor 504 includes allocation system 511, which may portion or allocate the financial instrument (e.g., futures contract) 506 into financial devices of fixed equal quantities, e.g., 8,400 financial devices 508A, 508B, 508C (generally, 508), etc. of 5 gallons each. The distributor 504 makes financial devices 508A, 508B, 506C available for purchase by consumers. It should be appreciated that such consumers typically would not have the ability to purchase any portion of a financial instrument such as an RBOB gasoline futures contract. Such consumers typically would also not have the ability to easily redeem such portions as discussed herein, and would instead (without the disclosed embodiments) have to trade, i.e., sell, the financial instrument at an exchange computing system, await a suitable buyer to submit a counter offer, post margin to cover their risk of loss until their trade is completed, collect the proceeds of their transaction e.g., after the financial instrument is cleared by the clearinghouse of the exchange computing system, and only then would be able to spend the money.

A consumer may purchase financial device 508 from a variety of retail stores or terminals, such as terminals 510A, 510B, 510C (generally, 510). The purchase price of a financial device is determined based on the value of the RBOB gasoline futures contract at the time of the financial device. As explained above, the RBOB gasoline financial instrument can vary in price depending on the price of the underlying, RBOB gasoline. Thus, distributor 504 is incentivized to provide financial devices if the terminals, which may be numerous and geographically distributed throughout the United States or the world, can accurately and correctly calculate or determine the current price at which the financial devices should be sold to a consumer. Similarly, a consumer who owns a financial device 508 may use the financial device 508 as a currency substitute to purchase goods or services at one of terminals 510. Again, the value of a financial device 508 is calculated/determined by the terminal 510 at the location where the financial device 508 is being redeemed or transacted. In one embodiment, terminals 510 may be located at retail shops, gasoline stations, restaurants, bookstores, clothing shops, etc. In one embodiment, if the financial instrument and terminal are one in the same (a smart phone or computer being used to make a purchase online on the Internet), then the location of the redemption/transaction would be the location of the financial device itself.

The financial devices 508 represent fractions or portions of the associated financial instrument 506. Thus, the financial devices 508 rise and fall in value as the value of the associated financial instrument 506 (e.g., RBOB gasoline financial instrument) fluctuates. Like all financial instruments, financial instrument 506 will have an expiry date. At expiry the financial instrument may either be rolled over or cashed out at the market price.

The value at any given point in time that is assigned to the financial devices 508 should be based on the value of the financial instrument at that time. However, the value of the financial instrument is based on the order book object housed in the exchange computing system. The value that is assigned to the financial devices 508 (either when a financial device is purchased by the consumer, or when a consumer desires to redeem a financial device) is determined by the terminals, which as discussed herein may be geographically distributed all over the country, or the world, and may not be able to communicate in real-time with the order book object/transaction processor located within the exchange computing system 100.

Thus, it should be appreciated that the disclosed financial devices, which represent (or act as surrogates for) fractions of financial instruments traded on the exchange computing system, are only feasible if the geographically disparate terminals can receive current/near-current/accurate data about the underlying financial instrument within a timeframe considered acceptable to consumers. In other words, a consumer will not accept an unreasonably long delay to purchased or redeem the financial devices.

The distributor 504 will also likely only agree to fractionalize the financial instrument into financial devices (e.g., create and make financial devices 508 available for consumer purchase/redemption at the terminals) if the distributor 504 is assured that the values for the financial device, calculated by the terminals, are based on an accurate value of the financial instrument, which is controlled by or based on activity occurring within the exchange computing system where the financial instrument is traded.

Moreover, consumers will only likely use the financial devices if they can be assured that the purchased or redemption value of the financial device, calculated by the terminals, are based on an accurate value of the financial instrument, which is controlled by or based on activity occurring within the exchange computing system where the financial instrument is traded.

Finally, the distributor 504 should also be assured that different terminals should be able to converge upon or determine the same values for financial devices 508A, 508B, 508C etc. that relate to the same financial instrument 506 at any given point in time. Again, the terminals may be located at geographically disparate locations, e.g., a mall in New York and a gas station in San Francisco, and each terminal may be different levels of speed and networking access to the distributor 504's systems.

The disclosed embodiments may implement an electronic tokening system to ensure that the terminals have access to accurate and reliable values for the financial instrument, that multiple disparate terminals calculate/determine the same value for financial devices at any given time, and that transactions executed by terminals (e.g., acquisition/redemption of financial devices) can be completed within a reasonable amount of time compared to typical transactions (e.g., cash or credit card transactions) executed at the same terminals. The disclosed embodiments may increase distributor confidence in the financial device system (e.g., that the terminals will execute or operate upon financial devices at values approved by the distributor, and that different terminals can determine or arrive at the same price for financial devices), such that the distributors are willing to accept the risk and operating costs of fractionalizing financial instruments into financial devices as well as the risk of locking prices, i.e., that the price will disadvantageously change subsequent to being set, within the time windows as will be described. The disclosed embodiments may also increase consumer confidence in the financial devices, e.g. that the price will not disadvantageously change subsequent to being set, within the time windows as will be described, and may increase the ease of use and convenience of the financial device system. For example, the disclosed embodiments may enable the terminals to quickly (e.g., at least as fast as other payment transactions performed by the terminals) purchase and redeem the disclosed financial devices.

As shown in FIG. 5, distributor 504 may include electronic tokening system 512. Alternatively, in one embodiment, the electronic tokening system 512 may be located within exchange computing system 502. Thus, in one embodiment, the token management system may be located within the exchange computing system. In one embodiment, the exchange computing system and the distributor 504 may be the same entity, e.g., the futures/options exchange computing system that facilitates trading of a financial instrument also creates, circulates and is responsible for the financial devices that represent or act as surrogates for portions of the financial instrument.

Figure 6:
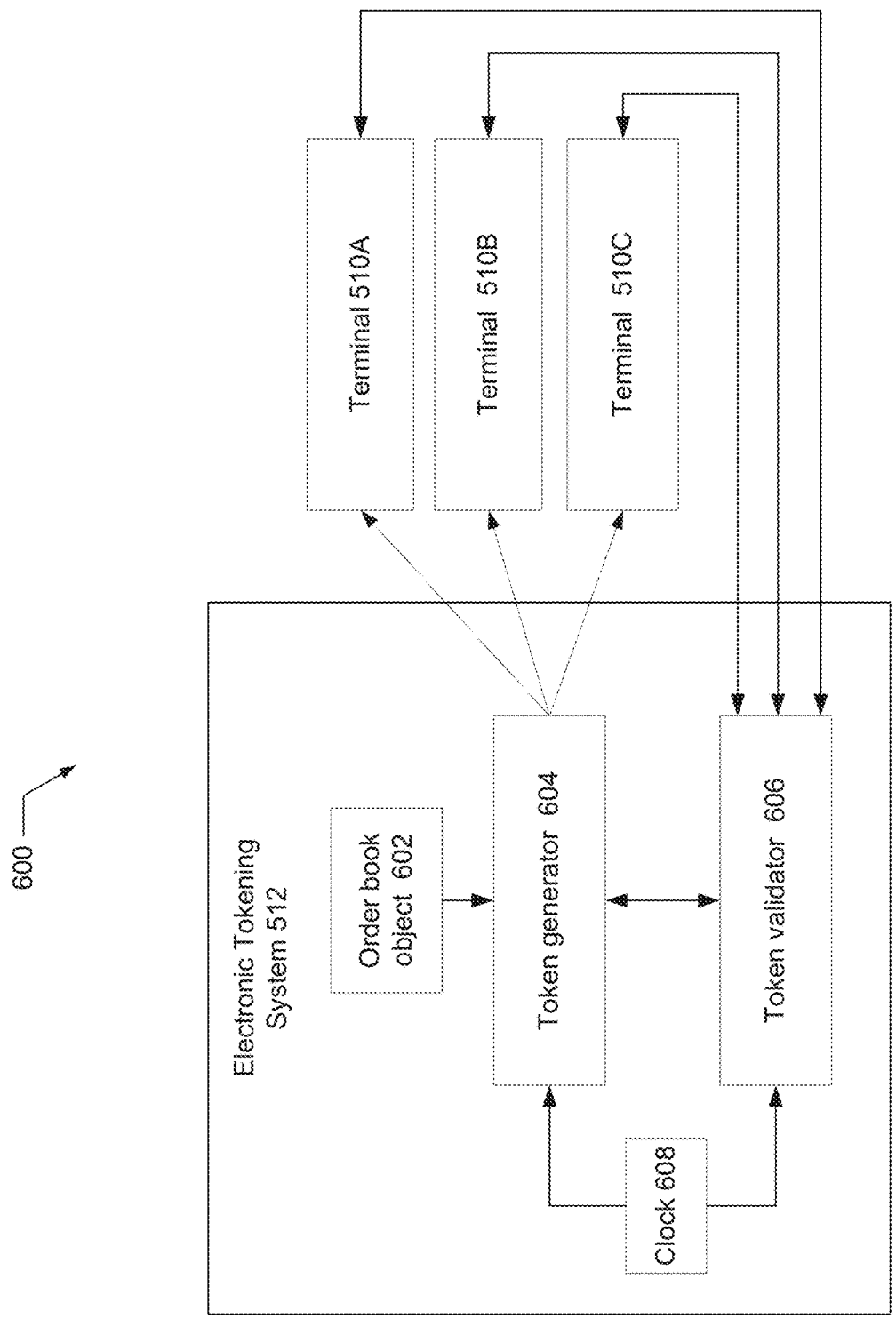
FIG. 6 depicts an example electronic tokening system, according to some embodiments.

FIG. 6 illustrates an example embodiment of an electronic tokening system 512. Electronic tokening system 512 includes an order book object 602, a token generator 604, a token validator 606 and clock 608. Order book object 602 may be a locally maintained copy of the order book object maintained and utilized by the exchange computing system (not shown). Thus, the tokening system, which may be housed within distributor 504, may maintain its own copy of book objects, and apply changes indicated by received messages, e.g., via data feeds, to the object in order to arrive at the most current or accurate state of the book object.

Alternatively, in one embodiment, if the tokening system is located within exchange computing system 502, the order book object 602 is generated by the exchange computing system, and each time a message is processed by the match engine, the exchange computing system directly updates/modifies the order book object 602.

Token generator 604 is in communication with order book object 602 and clock 608. Clock 608 and clocks in communication with the terminals may all be synchronized with a network clock to ensure that all the clocks are synchronized. Clock 608 may be a hardware unit, such as the Solarflare Precision Time Protocol (PTP)™ hardware. Clock 608 may be used to add timestamps and time windows (e.g., ranges of times defined by a begin time and an end time) to tokens generated by the token generator as discussed herein.

Order book object 602 may include the most recent pricing information for financial instrument 506 received by the electronic tokening system 512. As discussed above, the order book object 602 may be periodically updated so that the order book object 602 is synchronized with the order book object located within the exchange computing system (not shown).

Electronic tokening system 512 includes token generator 604, which may be implemented as a separate component or as one or more logic components, such as on an FPGA which may include a memory or reconfigurable component to store logic and a processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to, or otherwise be operative to, generate secure electronic tokens based on the most recently received order book object data that are associated with different time windows, as discussed herein, and may be time released or expire at different times. Each of the secure electronic tokens may include values for financial instruments and/or financial devices and may include an active time window and a valid time window.

Figure 7:
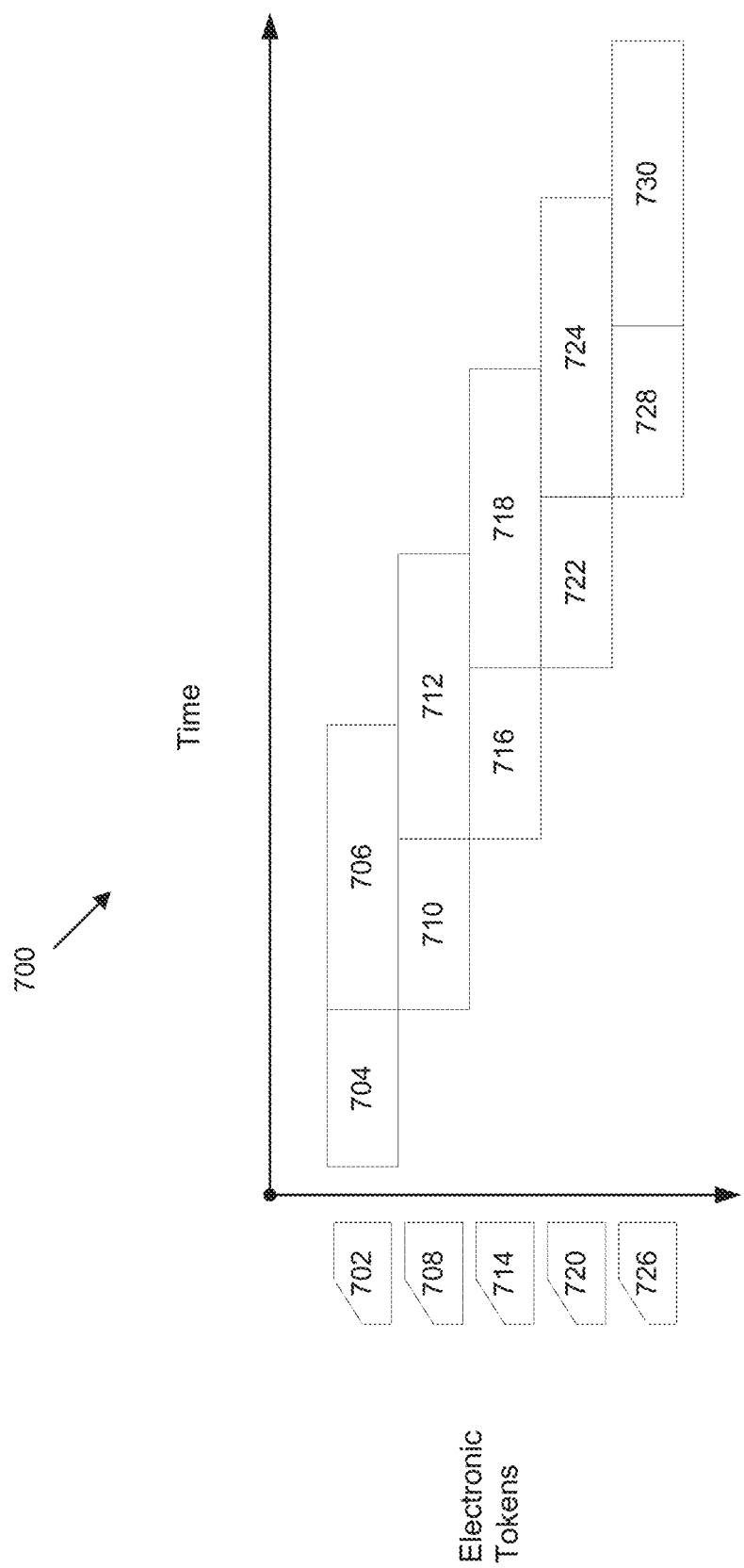
FIG. 7 depicts an example timing diagram associated with secure electronic tokens, according to some embodiments.

FIG. 7 illustrates a timing diagram 700 illustrating the active time windows and valid time windows for a plurality of electronic tokens 702, 708, 714, 720 and 726. Electronic tokens 702, 708, 714, 720 and 726 may be transmitted by token generator 604 to each of terminals 510A, 510B, and 510C. Electronic tokens 702, 708, 714, 720 and 726 may all be associated with the same financial instrument, e.g., electronic tokens 702, 708, 714, 720 and 726 can be used to determine values (e.g., operative values) for financial devices based on a common financial instrument. If a terminal is allowed, or otherwise configured, to transact on different types of financial devices, e.g., financial devices based on different financial instruments, the token generator 604 may generate and configure additional electronic tokens for the different financial instruments.

In one embodiment, token generator 604 transmits multiple electronic tokens 702, 708, 714, 720 and 726 to one or more of the plurality of terminals at the same time. Each of electronic tokens 702, 708, 714, 720 and 726 are valid or active during subsequent overlapping or non-overlapping time periods specified in the electronic tokens themselves. In one embodiment, the token generator 604 may subsequently replace one or more of electronic tokens 702, 708, 714, 720 and 726 with new tokens having updated data. For example, after transmitting electronic tokens 702, 708, 714, 720 and 726, the token generator 604 may receive updated pricing information for financial instrument 506 that affects the pricing for financial device 508A if the financial device is redeemed at time t=A. Electronic token 714 may be associated with the pricing of financial device 508A at time t=A. The token generator 604 may generate a new electronic token 714, which now specifies updated values for financial device 508A, and is associated with time t=A, and transmit electronic token 714 to the one or more of the plurality of terminals.

In one embodiment, the electronic tokens are released or transmitted to the terminals in different time stages, e.g., the token generator 604 transmits electronic tokens 702, 708 and 714 at the same time, or transmits electronic tokens 702, 708 and 714 in the same data message to the terminals, and later transmits additional tokens 720 and 726. As shown in FIG. 7, each electronic token is associated with an active time window and a valid time window. For example, electronic token 702 is associated with an active time window 704 and a valid time window 706, electronic token 708 is associated with an active time window 710 and a valid time window 712, electronic token 714 is associated with an active time window 716 and a valid time window 718, electronic token 720 is associated with an active time window 722 and a valid time window 724, and electronic token 726 is associated with an active time window 728 and a valid time window 730.

In one embodiment, only one token may be active during a same window. Thus, in one embodiment, the active time windows 704, 710, 716, 722 and 728 for the electronic tokens 702, 708, 714, 720 and 726, respectively, which are included within the respective electronic tokens, do not overlap. The token generator 604 may update or replace tokens over time, based on changing order book object information. For example, if a trade for financial instrument 506 is executed at the exchange computing system, the order book object 602 is updated, which affects the token values generated by token generator 604. Token generator 604 may then need to publish or broadcast a new plurality of electronic tokens replacing the previously transmitted electronic tokens.

An electronic token may be considered to expire when the active time window for the electronic token ends, of if the terminal receives a new electronic token that is valid for the same time period as the previous electronic token i.e., that supersedes the previous electronic token.

An electronic token may be validated by the token validator 606 even after the electronic token has expired.

The electronic tokens may thus be considered to be sequential and continuous. Electronic token 702 expires when the next electronic token 708 becomes active, electronic token 708 expires when electronic token 714 becomes active, etc.

In one embodiment, electronic tokens may only include a start time for the active time window. The end time for the active time window is determined by the next sequential electronic token's activation time. Thus, token generator 604 may only need to generate values and start times for different electronic tokens. Token generator 604 may also generate values for end times for different electronic tokens, where the end time indicates the time by which a token (e.g., an augmented token) must be validated by the token validator 606.

In one embodiment, the active time window and the valid time window for a financial instrument/token may be adjusted for different terminals. In one embodiment, the tokening system provides longer time windows for terminals that are further away from the tokening system, or have slower network connections to the tokening system. In one embodiment, the disclosed system may send test messages over the network to test/measure latency from the distributor 504 to the various terminals, and then adjusts token transmission times to different terminals based on the measured latency from the distributor 504 to each individual terminal so as to attempt to synchronize the arrival thereof.

In one embodiment, the token generator generates a plurality of tokens at the beginning of each different active time window.

In one embodiment, the secure electronic token includes information about the financial instrument and/or the financial devices that can be valued based on the secure electronic token. The secure electronic token also includes a creation time data, indicating the time at which the secure electronic token was generated by token generator 604.

Electronic tokening system 512 includes token validator 606, which may be implemented as a separate component or as one or more logic components, such as on an FPGA which may include a memory or reconfigurable component to store logic and a processing component to execute the stored logic, e.g. computer program logic, stored in a memory 204, or other non-transitory computer readable medium, and executable by a processor 202, such as the processor 202 and memory 204 described with respect to FIG. 2, to cause the processor 202 to, or otherwise be operative to, inspect modified or augmented tokens to determine if an augmenting terminal properly retrieved or accessed the token during the token's active window. The token validator 606 may be configured to further augment or modify an augmented secure electronic token and transmit validated secure electronic tokens to an augmenting terminal.

Figure 8:
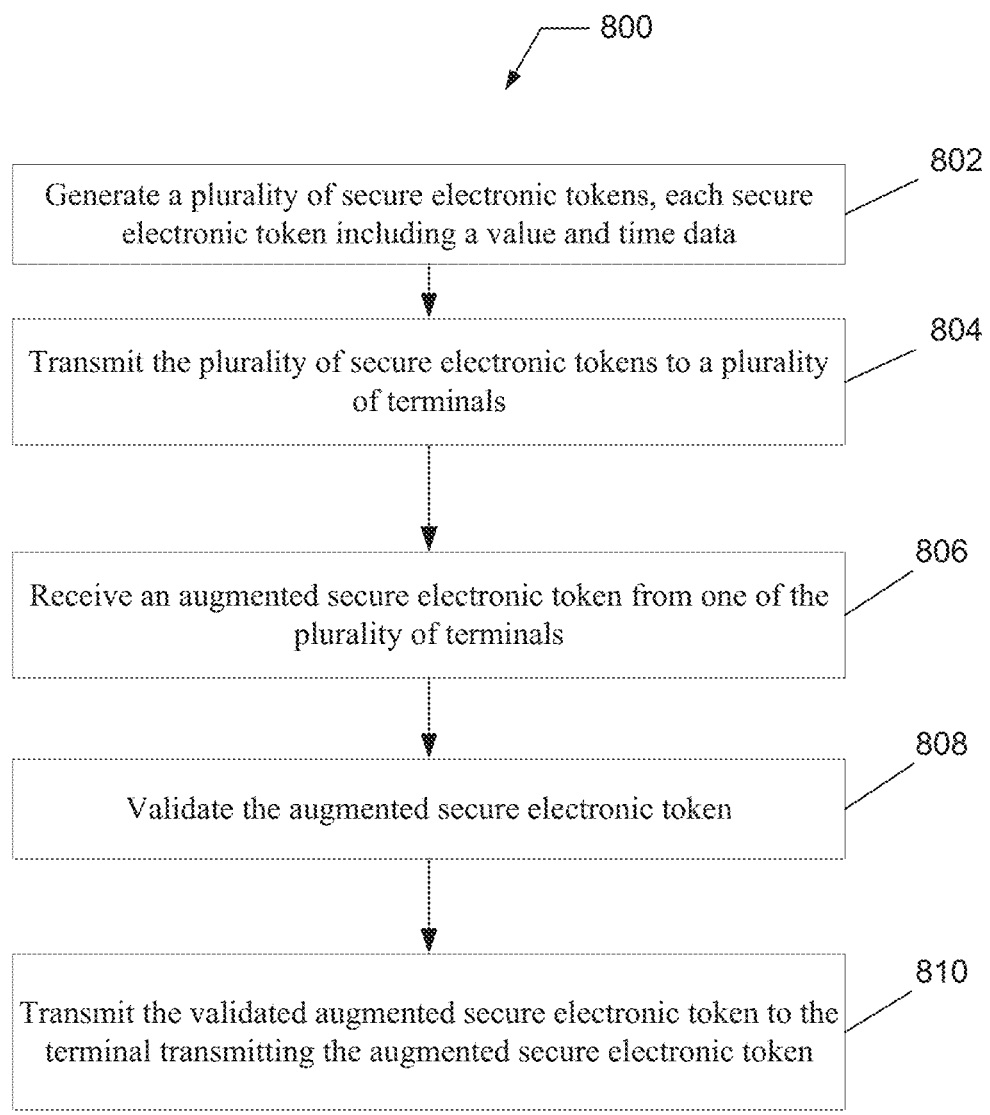
FIG. 8 depicts a high-level flowchart illustrating a method for utilizing secure electronic tokens in an electronic tokening system, according to some embodiments.

FIG. 8 illustrates an example flowchart of a computer implemented method 800 for utilizing secure electronic tokens, which may be implemented in an electronic tokening system. Embodiments may involve all, more or fewer actions than the illustrated actions. The actions may be performed in the order or sequence shown, or in a different sequence.

At step 802, method 800 includes, generating a plurality of secure electronic tokens, each secure electronic token including a value and time data. For example, token generator 604, in one embodiment, extracts snapshots of information from order book object 602. The snapshots represent a current state of the order book object 602. Token generator 604 generates secure electronic tokens that include values based on data received from the order book object 602 and the clock 608. Each token is associated with a value for the financial device based on the current/most recent value for the associated financial instrument. Each token is also associated with an active time window and a valid time window. As discussed below, a token is only active, or can be used by a terminal, during the active time window.

At step 804, method 800 includes transmitting the plurality of secure electronic tokens to a plurality of terminals. In one embodiment, token generator generates and broadcasts a plurality of tokens at periodic intervals. The token generator transmits the plurality of tokens to each of the plurality of terminals. In one embodiment, the electronic tokens associated with a financial instrument are determined, and transmitted, to the terminals each time a new value for the financial instrument is received by the distributor 504.

Terminals receive and store the plurality of tokens. The terminal can use the tokens to determine the value of a financial device. The terminals retrieve and use the tokens when a consumer or some other user desires to acquire or redeem a financial device. The tokening system is configured in one embodiment to only allow the use of/validate tokens that are retrieved by terminals when the token is active. Thus, the terminals are configured to identify and retrieve active tokens.

In one embodiment, a terminal only stores and maintains the most recently received token for each financial instrument that is supported/implemented by the computer system 500. Each new token received by the terminal replaces previously received tokens. However, if a token is retrieved by the terminal and a new token is received immediately thereafter, the terminal may need to store/maintain both tokens. The terminal is configured to know which token is active at any given time, and only retrieves an active token when a financial device is acquired or redeemed (or generally, operated upon) by the terminal.

The terminal retrieves an active token when a financial device is operated upon at the terminal. The terminal extracts the value of the financial instrument from the token, and uses the value of the financial instrument to determine the value of the financial device being operated. The value of the financial device being operated may be referred to as the operative value of the financial device, e.g., value at which the terminal sells or redeems the financial device.

In one embodiment, the terminal prompts the customer, e.g., via a user interface coupled to or included with the terminal, whether the value of the financial device is acceptable to the consumer. If the consumer does not accept the financial device value, the transaction involving the financial device is canceled. If the consumer accepts the value of the financial device calculated by the terminal, the terminal modifies the token to add information indicating acceptance by the consumer. The terminal may also include information about the time when the consumer accepted the financial device value. The terminal then transmits the modified token to the token validator 606.

In one embodiment, the augmenting terminal (which is the terminal where the financial device is operated upon, e.g., at purchase or redemption of the financial device) includes additional information in the secure electronic token, such as information identifying the consumer who wishes to operate upon the secure electronic token at the terminal.

The terminal may also be able to add additional value (or portions of the financial instrument) to a financial device, which may be referred to as refilling or reloading the financial device.

At step 806, method 800 includes receiving an augmented secure electronic token from one of the plurality of terminals. At step 808, method 800 includes validating the augmented secure electronic token. For example, token validator 606 inspects the modified or augmented token to determine if the terminal properly retrieved the token during the token's active window. In one embodiment, the token validator may also check whether the token validator received the augmented token within the valid time window of the token.

At step 810, method 800 includes transmitting the validated augmented secure electronic token to the terminal transmitting the augmented secure electronic token. If the token validator determines that the token was retrieved by the terminal during the active time window (and, in one embodiment, that the augmented token was received by the token validator within the valid time window), the token validator further augments the augmented secure electronic token, e.g., by setting or modifying a flag or field in the secure electronic token. Thus, validating (by token validator

606) an augmented (by the augmenting terminal) secure electronic token may include further modifying or setting a flag in the augmented secure electronic token.

In one embodiment, the token validator 606 generates a validation message and transmits the validation message to the terminal.

In one embodiment, if the customer is prompted to accept the financial device value, the token validator determines whether the value associated with the token, or based on the token, was accepted by the customer during the token's active window. It should be appreciated that in one embodiment, the valid time window cannot be less than the active time window. In one embodiment, the valid time window is the same as the active time window.

The terminal waits for a validated augmented secure electronic token from the token validator. Upon receiving the validated augmented secure electronic token from the token validator, the terminal completes the operation involving the financial device.

The disclosed embodiments recognize that due to the geographical distribution of the terminals, and the different connections speeds at which the terminals connect to the electronic tokening system 512, different terminals receive tokens at different times. It should be appreciated that the disclosed tokening system allows the distributor 504 to impose time based restrictions on the tokens, in particular, how much time can elapse before when a token is generated, when the token is retrieved/accepted at a terminal, and when an accepted token is validated, which facilitates different terminals being able to associate the same token value at the same time.

The secure electronic tokens may be encrypted to ensure they are not tampered with. For example, the secure electronic tokens may be in one of an XML, YAML, or JSON format, and be monitored by a centralized distributed server using certificates. It should be appreciated that the secure electronic tokens form the basis upon which the terminals price and value financial devices. Thus, the secure electronic tokens should be tamper-proof and transmitted in a secure, immutable manner. In one embodiment, terminals may be configured to be able to append or add timestamp information to secure electronic tokens, but terminals are not able to modify values associated with the electronic tokens. The secure electronic tokens may be stored and/or distributed (e.g., by/to/from the exchange computing system, distributor, and plurality of terminals) over a blockchain. Duplication of the secure electronic tokens can be prevented by implementing the secure electronic tokens in a blockchain such as ethereum. In one embodiment, the blockchain implementation may use Bilateral Assertion Models And Ledgers as disclosed in U.S. patent application Ser. No. 15/166,829, entitled "Bilateral Assertion Model And Ledger Implementation Thereof", and Ser. No. 15/166,838, entitled "Bilateral Assertion Model And Ledger Implementation Thereof", herein incorporated by reference in their entireties and relied upon. In one embodiment, each electronic token may be a new transaction on the block, or a new block on the blockchain that supersedes a previous token.

Figure 9:
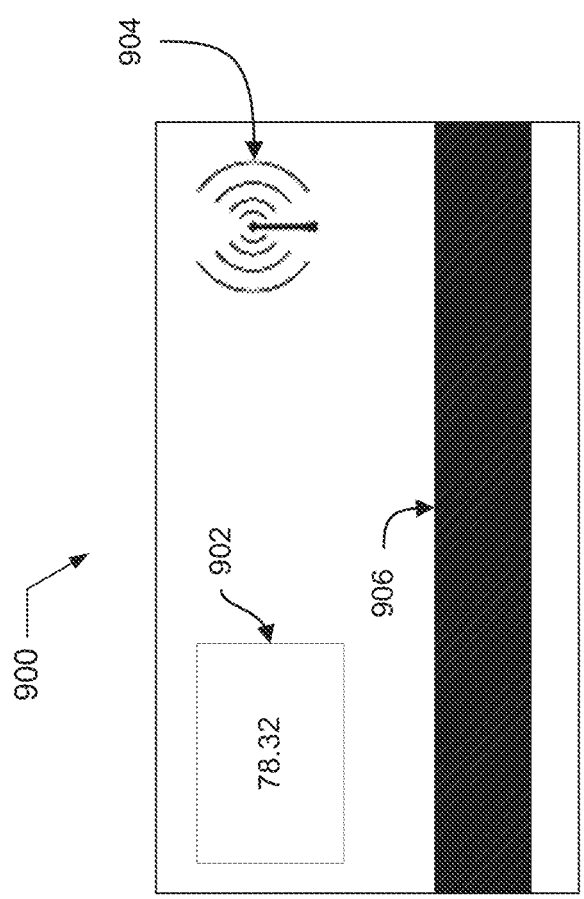
FIG. 9 depicts an example device that is utilized to implement a secure electronic tokening system.

In one embodiment, the financial device may be a wireless card, such as wireless card 900 illustrated in FIG. 9. Financial device 900 includes an integrated display 902 for displaying the current value (based on an active secure electronic token) of the financial device, radio or wireless communications means 904, and a storage medium such as magnetic stripe 906. The financial device may communicate wirelessly with the tokening system and receive, and display, periodic updates from the tokening system about the value of the financial device. For example, the financial device may poll/pull quotes from the tokening system, or the tokening system may push periodic updates to the financial device. The device may "subscribe" to this push service. The price quote may include a "time remaining" count down as to how long the value is good for if not otherwise superseded. The consumer can accordingly conveniently check the value of the financial device before actually redeeming the financial device at a terminal. The financial device 900 may be redeemed by swiping the card at a terminal equipped to read magnetic stripe based cards.

In one embodiment, the terminal and the financial device may both be embedded within a smart phone or mobile device. The token generator 604 and token validator 606 may be in wireless electronic communications with the mobile device containing the disclosed terminal and financial device. The financial device may be implemented as an application on the smart phone. The smart phone or mobile device may be configured to display current values for the financial device, if retrieved. Upon seeing a value for the financial device (based on the currently active secure electronic token) that is desirable to the user, the user may choose to initiate a purchase of good or services using the smart phone.

In one embodiment, the secure electronic tokens may be used to electronically transmit current exchange rates from an exchange rate provider to a plurality of terminals that perform currency exchange transactions. In this embodiment, the financial device may represent an interest in a currency instrument, such as a currency/forward/interest-rate swap, or an account which holds funds in a currency different from the currency used to make the transaction. The financial device could then be used at any terminal where the local currency (or currency used to price the transaction) is different from the currency of the financial device, or the currency in which the financial device was initially purchased.

A customer may purchase financial devices through a retail point of sale terminal, or online through a website. A customer's account may consist of two parts, an RBOB futures quantity and a cash offset. When a customer purchases a financial device, the terminal communicates with the distribution system 1100 to determine, via the secure electronic tokens described herein, the value of the financial instrument and uses the financial instrument value to determine the financial device value. The terminal may accept payment in cash from the customer, and convert the cash into a financial device. The cash offset part of the account may be maintained to charge fees to the financial device.

When the customer attempts to redeem the financial device, the terminal may check the cash balance associated with the financial device. If the cash balance is less than the requested amount, the terminal may check the value associated with the futures quantity. The terminal, in one embodiment, may communicate with the electronic tokening system to determine the value of the financial instrument, and thus the financial device, at that point in time. If the value determined for the financial device is equal to or greater than (e.g., covers) the requested amount (e.g., for the goods or services being purchased), the terminal transmits a request to the allocation system to sell the financial device. Upon successfully selling the financial device, the corresponding amount is credited to the cash portion of the card. The terminal then authorizes the purchase of the goods/services at the terminal. Any balance amount from redeeming the financial device minus the purchase will be stored as cash and associated with the financial device. It should be appreciated that the distributor 504 may not sell the financial instrument until all of the financial devices associated with a financial instrument (e.g., the 8,400 financial devices that all relate to a single RBOB futures contract) are redeemed. In other words, the distributor 504 may hold the financial instrument for a longer period of time than the amount of time that any of the consumers hold the corresponding financial devices.

Figure 10:
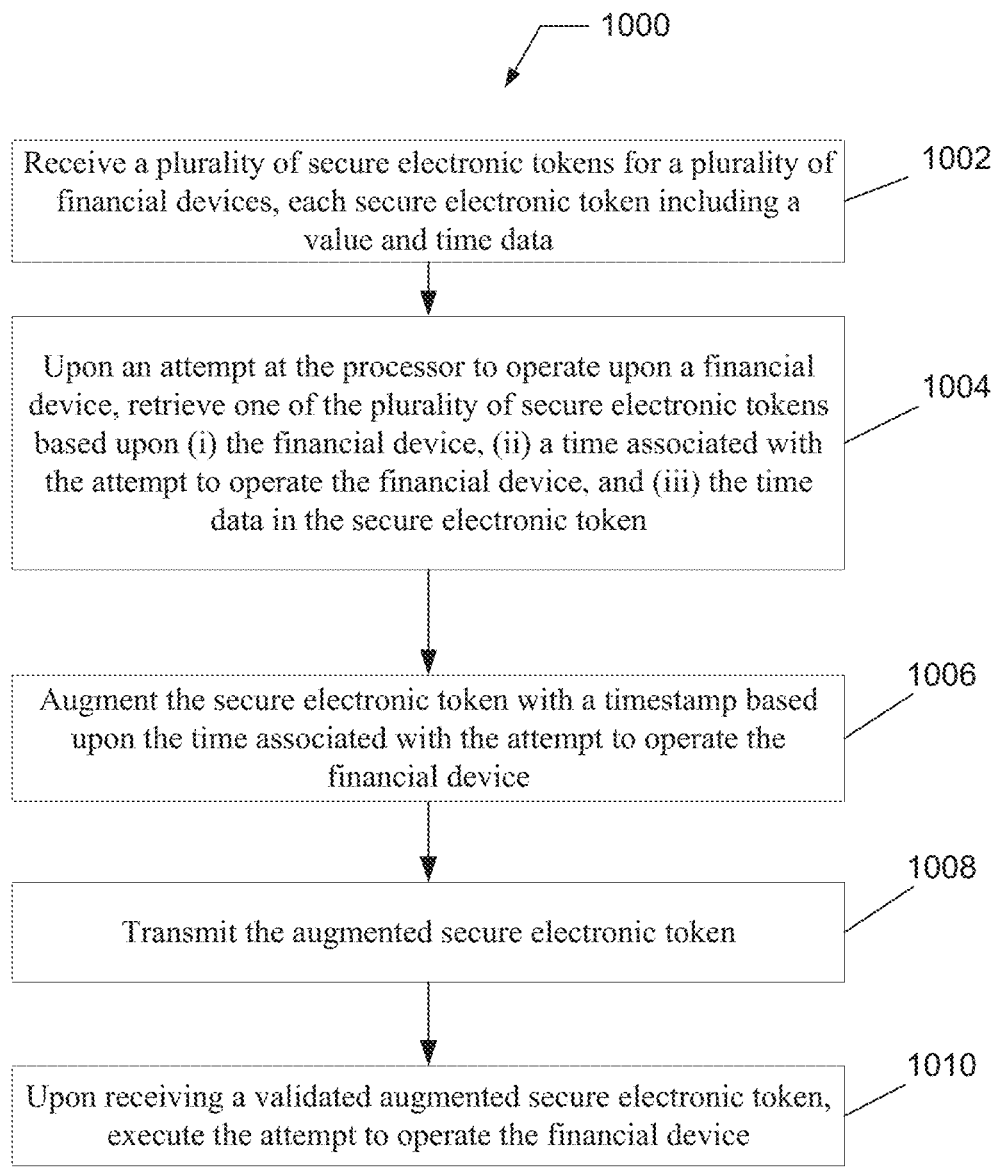
FIG. 10 depicts a high-level flowchart illustrating a method for determining values based upon secure electronic tokens, according to some embodiments.

FIG. 10 illustrates another example flowchart of a computer implemented method 1000 for utilizing secure electronic tokens, which may be implemented by terminals in communications with an electronic tokening system. Embodiments may involve all, more or fewer actions than the illustrated actions. The actions may be performed in the order or sequence shown, or in a different sequence.

At step 1002, method 1000 includes receiving a plurality of secure electronic tokens for a plurality of financial devices, each secure electronic token including a value and time data. For example, a terminal may receive, from a token generator, a plurality of secure electronic tokens for a plurality of financial devices. The terminal may be configured to operate upon (e.g., sell or redeem) various different financial devices, where a first plurality of the financial devices may be associated with a first financial instrument, and a second plurality of the financial devices may be associated with a second financial instrument.

At step 1004, method 1000 includes, upon an attempt to operate upon a financial device, retrieving one of the plurality of secure electronic tokens based upon (i) the financial device, (ii) a time associated with the attempt to operate the financial device, and (iii) the time data in the secure electronic token. For example, the secure electronic token that is retrieved by the terminal may depend upon the financial device being attempted to be operated upon, the time at which the financial device is attempted to be operated upon, and the secure electronic token associated with the financial device that is active at the time at which the financial device is attempted to be operated upon, which may be determined based upon the time data in the secure electronic token.

At step 1006, method 1000 includes augmenting the secure electronic token with a timestamp based upon the time associated with the attempt to operate the financial device. At step 1008, method 1000 includes transmitting the augmented secure electronic token. For example, the terminal may transmit the augmented secure electronic token to a token validator.

At step 1010, method 1000 includes, upon receiving a validated augmented secure electronic token, executing the attempt to operate the financial device. For example, the token validator may validate the augmented secure electronic token and generate a validated augmented secure electronic token, and transmit the validated augmented secure electronic token to the terminal. Upon receiving the validated augmented secure electronic token, the terminal may execute the operation that was attempted.

It should be appreciated that the distributor 504 may include the electronic tokening system and may include additional sub-systems to ensure that the financial device system is configured to portion financial instruments into financial devices and minimize the risk and financial exposure of the distributor 504.

For example, if the distributor 504 makes available financial devices 508 based on an RBOB futures contract, the distribution system 1100 may include sub-systems for portioning the RBOB contract 506 into financial devices 508, selling the financial devices 508, integrating with payment systems and terminals, internal management of financial devices based on futures contracts being brought and redeemed by customers, handling the financial risk posed by price fluctuations of the underlying commodity 506 held by the distributor 504, handling off market hour transactions, optimizing models that minimizes the risk and overhead associated with managing risk, and rolling over the contract 506 and buy/sell contacts and options from the exchange computing system.

Figure 11:
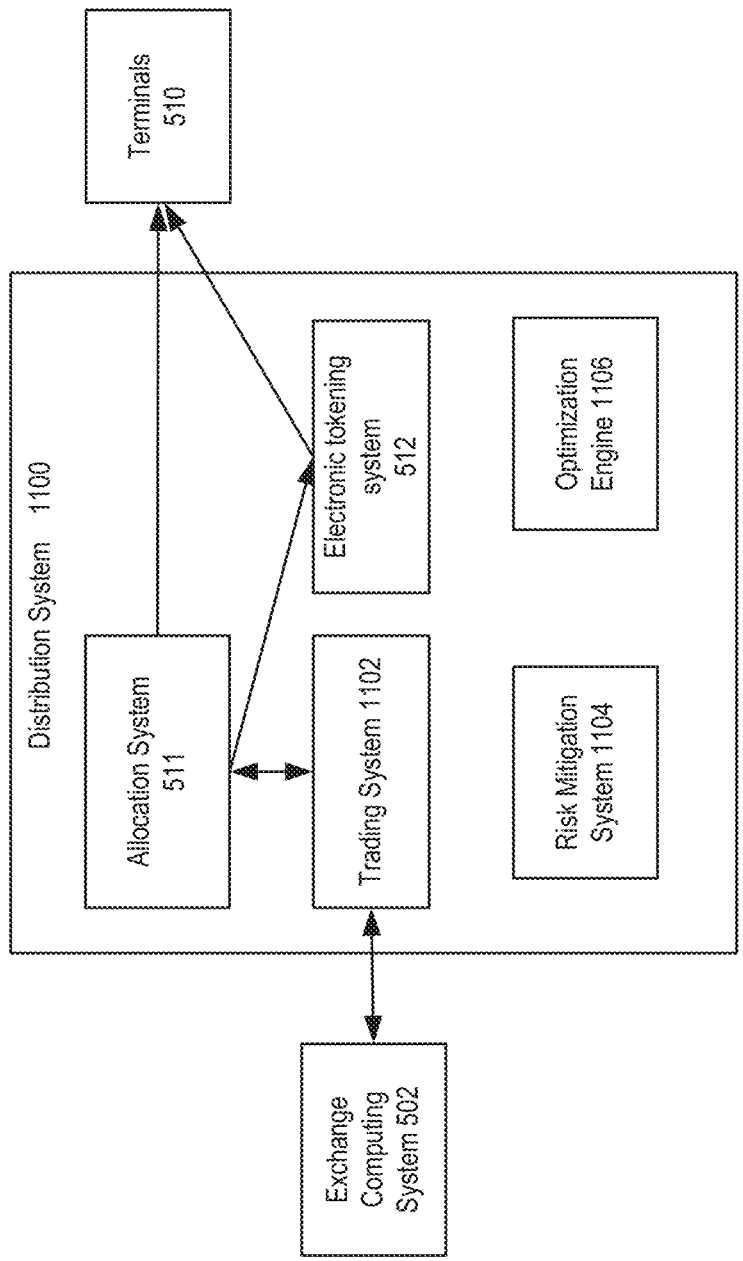
FIG. 11 depicts an example distribution system that implements an electronic tokening system, according to some embodiments.

FIG. 11 illustrates an example distribution system 1100, which may be implemented by a distributor 504. Distribution system 1100 includes allocation system 511, as discussed above, and electronic tokening system 512, as discussed above. Distribution system 1100 also includes trading system 1102, risk mitigation system 1104, and optimization engine 1106.

The trading system 1102 is implemented to buy and sell futures contracts from the exchange computing system, buy and sell options from the exchange computing system, and rollover and close contracts from the exchange computing system. These functions may be implemented as software running on servers with the flexibility of automatically scheduling purchases/sales and manual overrides of scheduled/programmed actions.

The allocation system 511 may portion an RBOB contract of 42,000 gallons into 8,400 financial devices of fixed equal quantities (5 gallons each). The financial devices 508 and the original contract 506 are associated with each other and should be tied together and tracked at various stages. For example, the various states at which the status of the financial instrument 506 and the financial devices 508 should be monitored and documented are initial purchase of the financial instrument, total pool of financial devices that are available for customer to purchase and redeem, and selling back and rolling over a financial instrument to the exchange computing system. It should be appreciated that all of the financial devices 508 in combination for any one financial instrument 506 add up to the total financial instrument 506 volume. At any given point in time, there may be some financial devices that are owned or held by either the distributor 504, or customers (who have purchased financial devices via terminals 510). It should be appreciated that if all of the financial devices 508 associated with a financial instrument 506 are redeemed, the distributor 504 may then sell the financial instrument 506 back to the exchange computing system.

Distributor 504 holds the RBOB futures contract 506 and financial devices 508 in varying amounts at various point in times, depending on how many of the financial devices 508 have been purchased by consumers. Distributor 504 may therefore manage the risk of price fluctuations to financial instrument 506 using put options for the futures contract. In one embodiment, the risk mitigation system 1104 is used to manage the price fluctuation risk by purchasing a RBOB futures contract and simultaneously buying a put option for the expiry date of the contract with a strike price of the purchase value of the contract. Such a methodology may insulate the distributor 504 from any downward price spiral compared to the purchase price.

In some cases, the risk mitigation system 1104 may be used to hold or carry more risk than the purchase price of the financial instrument. For example, a customer may redeem a financial device after the value of the financial instrument increases, compared to the price at which distributor 504 purchased the financial instrument. This can happen dynamically at various points in time. Thus, at any point in time the quantity and value of the futures contracts held by the distributor 504 should be evaluated. If the current options contract does not cover the identified risk, the distributor 504 should sell the current options contract and purchase a new options contract. The risk mitigation system 1104 should perform such evaluations and risk re-assessments at periodic intervals.

As discussed above, the holding of contracts by the distributor 504 involves price risk which should be managed through purchase of options. The cost of purchasing options corresponding to the futures contract (which is then apportioned into financial devices) may be passed on as a fee to the consumers who purchase financial devices. The optimization engine 1106 may be used to minimize the cost of purchasing such options. In one embodiment, the optimization engine 1106 may optimize a linear function that varies with the cost of the options and the number of trades required to purchase the options. The non-negative variables that may also be used by the optimization engine 1106 to optimize the purchase cost are the price of the futures contract, and the sale/redemption rates of the associated financial devices. The price of the futures contract may be highly variable, and the optimization engine 1106 may use quantitative models that forecast future price ranges determine the options strike prices. The quantity of financial devices held by the distributor 504 may also be highly variable, and is determined by the sale and redemption rate of the financial devices. The optimization engine 1106 may implement predictive models using historical, market and consumer data to calculate or predict future expected financial device sale and redemption rates. The optimization can accordingly estimate the quantity of futures and options contracts needed to be held by the distributor 504. The optimization engine 1106 in one embodiment minimizes the cost of maintenance with constraints of futures and options prices, the number of trades of options and how long a futures contract needs to be held by the distributor 504.

The optimization engine 1106 may also be used to support transactions when markets are closed. Even though financial markets typically close for a few hours each day, the purchase and redemption of financial devices at terminals can happen at any time of day, on any day. The optimization engine 1106 in one embodiment incorporates, into its optimization model, the impact and risk of calculating values for financial devices when the markets are closed.

Figure 12:
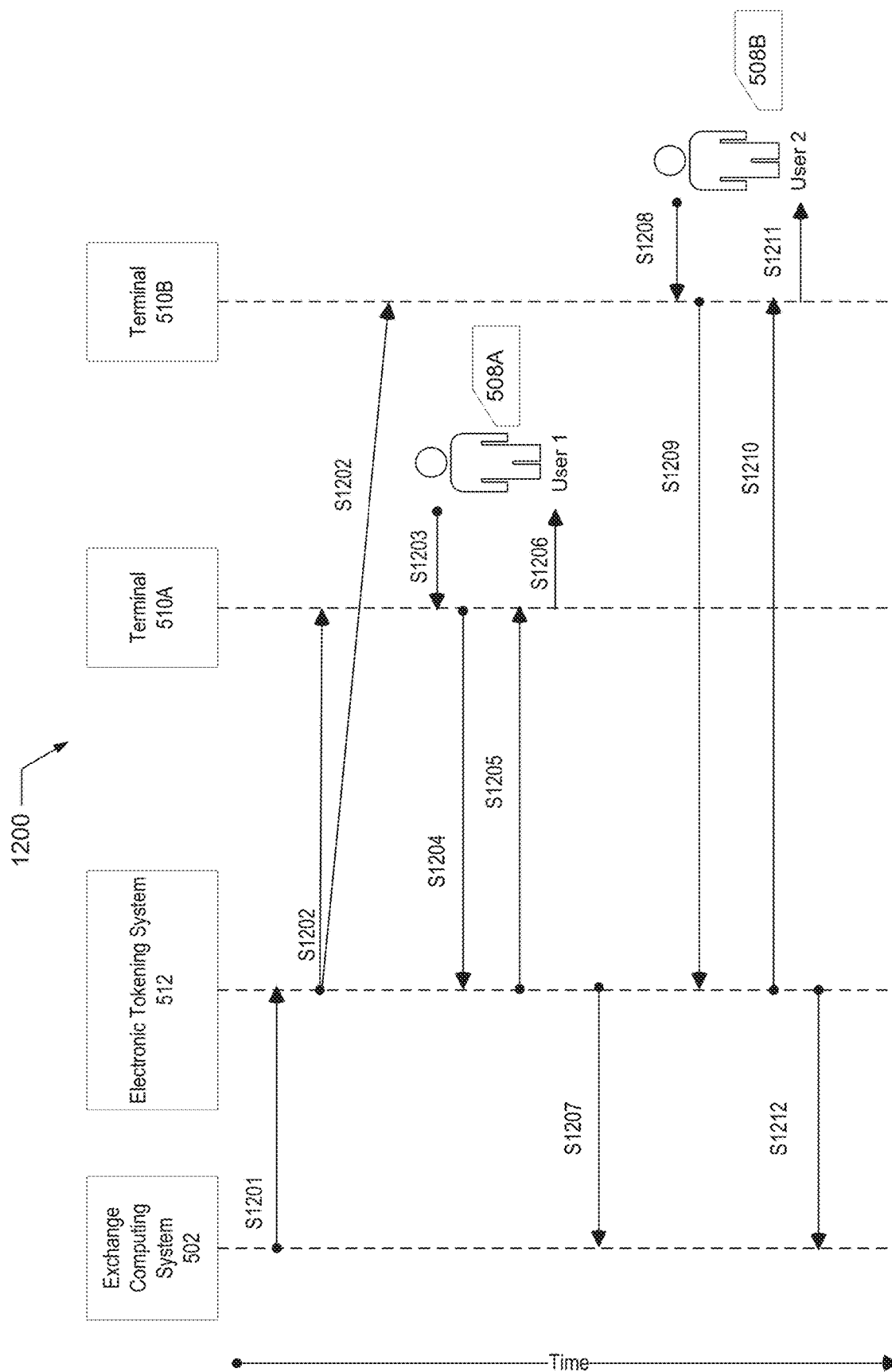
FIG. 12 depicts a diagram illustrating an example process of utilizing secure electronic tokens, according to some embodiments.

FIG. 12 depicts a diagram illustrating an example process 1200 of utilizing secure electronic tokens, where data is transmitted between an exchange computing system 502, an electronic tokening system 512, and terminals 510A and 510B. In stage S1201, the exchange computing system 502 transmits current/most recent information about a financial instrument 506 to an electronic tokening system 512. Stage S1201 may occur each time the value of financial instrument 506 changes, based on how financial instrument 506 is traded at the exchange computing system 502. Or, stage S1201 may occur periodically, e.g., every 100 microseconds.

In stage S1202, the electronic tokening system 512, which includes a token generator 604, generates a plurality of secure electronic tokens and transmits the secure electronic tokens to terminals 510A and 510B. In the illustrated example, terminal 510B may be geographically/logically further way from electronic tokening system 512 than terminal 510A. In other words, terminal 510A may receive the electronic tokens before terminal 510B receives the same electronic tokens.

In stage S1203, user 1 may attempt to operate on a financial device 508A at terminal 510A. Terminal 510A retrieves the appropriate/active electronic token based upon the time of the attempted operation of financial device 508A, as discussed herein, and calculates a value for the financial device 508A. Terminal 510A also augments the retrieved secure electronic token with information about the time when the secure electronic token was retrieved.

In stage S1204, terminal 510A transmits the augmented secure electronic token to the electronic tokening system 512, which includes a token validator 606. Electronic tokening system 512 determines if the correct/active token was retrieved by the terminal 510A. If the correct/active token was retrieved by the terminal 510A, in stage S1205, electronic tokening system 512 transmits the validated augmented secure electronic token to the terminal 510A. In stage S1206, upon receiving the validated augmented secure electronic token by terminal 510A at the conclusion of stage S1205, the terminal 510A executes the operation attempted/initiated by user 1 involving financial device 508A at terminal 510A. In stage S1207, the electronic tokening system 512 may additionally transmit data about the validated augmented secure electronic token to the exchange computing system 502.

The disclosed embodiments enable multiple users to transact upon different financial devices, which may be all related to the same financial instrument, at different terminals, as discussed herein. The different terminals, such as terminals 510A and 510B in FIG. 12, may be geographically disparate and may connect at different speeds and/or times with the electronic tokening system 512. The electronic tokening system 512 enables a distributor 504 to control the secure electronic tokens retrieved and used by the different terminals.

For example, in stage S1208, user 2 may attempt to operate on a financial device 508B at terminal 510B. Terminal 510B retrieves the appropriate/active electronic token based upon the time of the attempted operation of financial device 508B, as discussed herein, and calculates a value for the financial device 508B. Terminal 510B also augments the retrieved secure electronic token with information about the time when the secure electronic token was retrieved.

In stage S1209, terminal 510B transmits the augmented secure electronic token to the electronic tokening system 512, which includes token validator 606. Electronic tokening system 512 determines if the correct/active token was retrieved by the terminal 510B. If the correct/active token was retrieved by the terminal 510B, in stage S1210, electronic tokening system 512 transmits the validated augmented secure electronic token to the terminal 510B. In stage S1211, upon receiving the validated augmented secure electronic token by terminal 510B at the conclusion of stage S1210, the terminal 510B executes the operation attempted/initiated by user 2 involving financial device 508B at terminal 510B. In stage S1212, the electronic tokening system 512 may additionally transmit data about the validated augmented secure electronic token to the exchange computing system 502.

It should be appreciated that because financial devices 508A and 508B both relate to the same financial instrument 506, the disclosed embodiments attempt to ensure that terminals 510A and 510B determine the same value for the financial devices 508A and 508B respectively if the financial device 508A and 508B are attempted to be operated upon at the same time. For example, terminals 510A and 501B may receive the same electronic token values for a plurality of tokens 702, 708, 714, 720 and 726. The secure electronic token that is used and retrieved by a terminal depends on which token is active at the time of retrieval. For example, because user 1 attempts to operate financial device 508A during S1203, the terminal 510A calculates a value for financial device 508A based on the secure electronic token that is active during S1203. Similarly, because user 2 attempts to operate financial device 508B during S1208, the terminal 510B calculates a value for financial device 508B based on the secure electronic token that is active during S1208. If different secure electronic tokens are active during stages S1203 and S1208 (based on the secure electronic tokens transmitted to the terminals during S1202), the values calculated/validated for financial devices 508A and 508B may be different. Electronic tokening system 512 may replace the electronic tokens 702, 708, 714, 720 and 726 with updated values of tokens if new information about the financial instrument 506 is received by electronic tokening system 512.

Whether or not a secure electronic token is validated by the electronic tokening system 512 depends upon the time windows associated with a particular electronic token, as well as when the electronic token was retrieved by the terminal. For example, secure electronic token 702 may include value $50.01 for any financial device 508 based on financial instrument 506, and may include an active time window that includes or covers time t1. Secure electronic token 708 may include value $51.35 for any financial device 508 based on financial instrument 506, and may include an active time window that includes or covers time t2.

If terminal 510A attempts to operate a financial device 508, e.g., financial device 508A, at time t1, terminal 510A should retrieve and augment secure electronic token 702.

If terminal 510B attempts to operate a financial device 508, e.g., 508B, at time t2, terminal 510B should retrieve and augment secure electronic token 708.

Thus, the price at which a financial device 508 can be purchased or redeemed depends upon the time when a terminal attempts to operate the financial device 508. In one embodiment, the electronic tokening system 512 may transmit different electronic tokens (containing different values) to different terminals, depending on the geographical or logical distance (e.g., how much time is needed to communicate between the electronic tokening system 512 and the particular terminal) of the plurality of terminals.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination.

Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method for utilizing secure electronic tokens in an electronic tokening system, the method comprising:

receiving, by a processor, an order book object data from an exchange computing system that facilitates electronic trading of a financial instrument, the financial instrument being managed by the processor and having an actual value that fluctuates over time, and the order book object data comprising information about the financial instrument;

generating, by the processor based on the order book object data, a plurality of secure electronic tokens, each secure electronic token including a particular value of the financial instrument and time data indicative of a period of time for which the particular value is valid, each secure electronic token facilitating a payment via a financial device associated with at least a portion of the financial instrument;

transmitting, by the processor via a network, the plurality of secure electronic tokens to a plurality of terminals remote from the processor;

receiving, by the processor via the network, an augmented secure electronic token from an augmenting terminal, wherein the augmenting terminal is one of the plurality of terminals, wherein the augmented secure electronic token is one of the plurality of secure electronic tokens having been augmented with data indicative of acceptance of the particular value in the secure electronic token for the payment via the augmenting terminal, the augmented secure electronic token further including a timestamp appended to the secure electronic token by the augmenting terminal, the timestamp indicative of the time of the acceptance of the particular value;

validating, by the processor, the augmented secure electronic token by determining that the acceptance of the particular value in the secure electronic token occurred within the period of time for which the particular value is valid; and authorizing, by the processor, the use of the financial device for the payment by transmitting, by the processor via the network, a validated augmented secure electronic token to the augmenting terminal; and determining, by the augmenting terminal, based on receipt of the validated augmented secure electronic token, an operative value for the financial device, wherein the operative value is determined based on the augmented secure electronic token and the time of acceptance indicated by the appended timestamp regardless of whether the actual value of the financial instrument has changed subsequent to the transmitting of the plurality of secure electronic tokens; and using, by the augmenting terminal, the financial device for the payment based on the operative value for the financial device.

2. The computer implemented method of claim 1, wherein the validating comprises comparing the timestamp in the augmented secure electronic token to the time data in the augmented secure electronic token.

3. The computer implemented method of claim 1, wherein the time data includes an active time window and a valid time window.

4. The computer implemented method of claim 3, wherein the validating comprises determining if the timestamp is during the active time window and if the augmented secure electronic token was received by the processor during the valid time window.

5. The computer implemented method of claim 3, wherein each time window associated with a secure electronic token includes a start time and an end time.

6. The computer implemented method of claim 5, wherein each of the plurality of secure electronic tokens has a unique active time window start time.

7. The computer implemented method of claim 1, wherein the validating includes modifying a validity field in the augmented secure electronic token.

8. The computer implemented method of claim 1, wherein the timestamp is appended to the secure electronic token based upon an attempt to operate the financial device at the augmenting terminal.

9. The computer implemented method of claim 8, further comprising, causing, by the processor, the augmenting terminal to retrieve the secure electronic token for augmentation based upon (i) the financial device, (ii) a time associated with the attempt to operate the financial device, and (iii) the time data in the secure electronic token.

10. The computer implemented method of claim 8, wherein the timestamp is based on the time associated with the attempt to operate the financial device.

11. The computer implemented method of claim 8, wherein the financial device is one of a plurality of financial devices, and wherein each of the plurality of financial devices represents a portion of a same financial instrument.

12. The computer implemented method of claim 11, wherein the financial instrument is one of a futures contract, an options contract, or a forward swap.

13. The computer implemented method of claim 1, wherein the plurality of secure electronic tokens is a first plurality of secure electronic tokens associated with a same first financial instrument, the method further comprising:

generating, by the processor, a second plurality of secure electronic tokens associated with a second, different financial instrument; and transmitting, by the processor, the second plurality of secure electronic tokens to the plurality of terminals.

14. The computer implemented method of claim 13, further comprising causing, by the processor, the augmenting terminal to, based on the at least one of the second plurality of secure electronic tokens, determine an operative value of a financial device associated with the second financial instrument.

15. The computer implemented method of claim 1, further comprising transmitting secure electronic tokens over a blockchain.

16. A non-transitory computer-readable storage medium storing instructions that, when executed by one or more processing devices, cause the one or more processing devices to perform operations comprising:

receiving, an order book object data from an exchange computing system that facilitates electronic trading of a financial instrument, the financial instrument being managed by the processing devices and having an actual value that fluctuates over time, and the order book object data comprising information about the financial instrument;

generating, based on the order book object data, a plurality of secure electronic tokens, each secure electronic token including a particular value of the financial instrument and time data indicative of a period of time for which the particular value is valid, each secure electronic token facilitating a payment via a financial device associated with at least a portion of the financial instrument;

transmitting, via a network, the plurality of secure electronic tokens to a plurality of terminals remote from the one or more processing devices;

receiving, via the network, an augmented secure electronic token from an augmenting terminal, wherein the augmenting terminal is one of the plurality of terminals, and wherein the augmented secure electronic token is one of the plurality of secure electronic tokens having been augmented with data indicative of acceptance of the particular value in the secure electronic token for the payment via the augmenting terminal, wherein the augmented secure electronic token further includes a timestamp appended to the secure electronic token by the augmenting terminal, the timestamp indicative of the time of the acceptance of the particular value;

validating the augmented secure electronic token by determining that the acceptance of the particular value in the secure electronic token occurred within the period of time for which the particular value is valid; and authorizing the use of the financial device for the payment by transmitting via the network, a validated augmented secure electronic token to the augmenting terminal; and determining, based on receipt of the validated augmented secure electronic token, an operative value for the financial device, wherein the operative value is determined based on the augmented secure electronic token and the time of acceptance indicated by the appended timestamp regardless of whether the actual value of the financial instrument has changed subsequent to the transmitting of the plurality of secure electronic tokens; and using the financial device for the payment based on the operative value for the financial device.

17. A computer system for utilizing secure electronic tokens in an electronic tokening system, the computer system comprising:

means for receiving an order book object data from an exchange computing system that facilitates electronic trading of a financial instrument, the financial instrument having an actual value that fluctuates over time, and the order book object data comprising information about the financial instrument;

means for generating, based on the order book object data, a plurality of secure electronic tokens, each secure electronic token including a particular value of the financial instrument and time data indicative of a period of time for which the particular value is valid, each secure electronic token facilitating a payment via a financial device associated with at least a portion of the financial instrument;

means for transmitting the plurality of secure electronic tokens to a plurality of terminals remote from the computer system;

means for receiving an augmented secure electronic token from an augmenting terminal, wherein the augmenting terminal is one of the plurality of terminals, and wherein the augmented secure electronic token is one of the plurality of secure electronic tokens having been augmented with data indicative of acceptance of the particular value in the secure electronic token for the payment via the augmenting terminal, wherein the augmented secure electronic token further includes a timestamp appended to the secure electronic token by the augmenting terminal, the timestamp indicative of the time of the acceptance of the particular value;

means for validating the augmented secure electronic token by determining that the acceptance of the particular value in the secure electronic token occurred within the period of time for which the particular value is valid; and means for authorizing the use of the financial device for the payment by transmitting via a network a validated augmented secure electronic token to the augmenting terminal; and means for determining, based on receipt of the validated augmented secure electronic token, an operative value for the financial device, wherein the operative value is determined based on the augmented secure electronic token and the time of acceptance indicated by the appended timestamp regardless of whether the actual value of the financial instrument has changed subsequent to the transmitting of the plurality of secure electronic tokens; and means for using the financial device for the payment based on the operative value for the financial device.

* * * * *